(12) United States Patent
Sahin et al.

(10) Patent No.: US 11,309,544 B2
(45) Date of Patent: *Apr. 19, 2022

(54) HIGH POWER, EXTENDED TEMPERATURE RANGE-CAPABLE, HIGHLY ABUSE OVERCHARGE AND DISCHARGE TOLERANT RECHARGEABLE BATTERY CELL AND PACK

(71) Applicant: CAMX Power LLC, Lexington, MA (US)

(72) Inventors: Kenan Sahin, Lexington, MA (US); David Ofer, Needham, MA (US); Daniel Kaplan, Lexington, MA (US); Suresh Sriramulu, Arlington, MA (US)

(73) Assignee: CAMX Power LLC, Lexington, MA (US)

( * ) Notice: Subject to any disclaimer, the term of this patent is extended or adjusted under 35 U.S.C. 154(b) by 468 days.

This patent is subject to a terminal disclaimer.

(21) Appl. No.: 16/383,079

(22) Filed: Apr. 12, 2019

(65) Prior Publication Data
US 2020/0328416 A1    Oct. 15, 2020

(51) Int. Cl.
*H01M 4/525* (2010.01)
*H01M 4/485* (2010.01)
(Continued)

(52) U.S. Cl.
CPC .......... *H01M 4/525* (2013.01); *H01M 4/485* (2013.01); *H01M 4/661* (2013.01);
(Continued)

(58) Field of Classification Search
CPC .... H01M 4/525; H01M 10/0525; H01M 2/16; H01M 4/485; H01M 4/66; H01M 50/449;
(Continued)

(56) References Cited

U.S. PATENT DOCUMENTS 7,824,800 B1* 11/2010 Dunstan ............ H01M 10/0525
429/188
2011/0027646 A1 2/2011 Lee et al.
(Continued)

FOREIGN PATENT DOCUMENTS

CN        104904054 A    9/2015
JP         4968578 B2    7/2012
(Continued)

*Primary Examiner* — Alexander Usyatinsky
(74) *Attorney, Agent, or Firm* — Dinsmore & Shohl LLP; Weston R. Gould

(57) ABSTRACT

Provided are electrochemical secondary cells that exhibit excellent abuse tolerance, deep discharge and overcharge conditions including at extreme temperatures and remain robust and possess excellent performance. Cells as provided herein include: a cathode a polycrystalline cathode electrochemically active material including the formula $Li_{1+x}MO_{2+y}$, wherein $-0.9 \leq x \leq 0.3$, $-0.3 \leq y \leq 0.3$, and wherein M includes Ni at 80 atomic percent or higher relative to total M, the cathode electrochemically active material comprising a non-uniform distribution of Co; an anode including an anode electrochemically active material of the formula $Li_{4+a}Ti_5O_{12+b}$ wherein $-0.3 \leq a \leq 3.3$, $-0.3 \leq b \leq 0.3$; and wherein the anode and the cathode each independently include a current collector substrate comprising aluminium.

24 Claims, 17 Drawing Sheets

(51) Int. Cl.
*H01M 10/0525* (2010.01)
*H01M 4/66* (2006.01)
*H01M 50/411* (2021.01)
*H01M 50/431* (2021.01)
*H01M 50/449* (2021.01)

(52) U.S. Cl.
CPC ..... *H01M 10/0525* (2013.01); *H01M 50/411* (2021.01); *H01M 50/431* (2021.01); *H01M 50/449* (2021.01)

(58) Field of Classification Search
CPC .. H01M 50/411; H01M 4/661; H01M 50/446; H01M 4/623; H01M 50/431; H01M 2300/004; Y02E 60/10
See application file for complete search history.

(56) References Cited

U.S. PATENT DOCUMENTS

| | | | |
|---|---|---|---|
| 2012/0315384 A1* | 12/2012 | Abd Elhamid | H01M 50/411 427/126.2 |
| 2014/0134472 A1 | 5/2014 | Kim | |
| 2015/0140433 A1* | 5/2015 | Yasuda | H01M 4/366 429/231.1 |
| 2015/0340691 A1* | 11/2015 | Inoue | H01M 4/38 429/219 |
| 2015/0349382 A1* | 12/2015 | Kwon | H01M 10/045 429/94 |
| 2016/0049650 A1 | 2/2016 | Noh et al. | |
| 2018/0048015 A1 | 2/2018 | Lee et al. | |
| 2019/0036118 A1* | 1/2019 | Ofer | H01M 10/052 |

FOREIGN PATENT DOCUMENTS

| | | |
|---|---|---|
| KR | 1020090115140 A | 11/2009 |
| WO | 2017/189887 A1 | 11/2017 |
| WO | WO 2017/189887 * | 11/2017 |

* cited by examiner

HIGH POWER, EXTENDED TEMPERATURE RANGE-CAPABLE, HIGHLY ABUSE OVERCHARGE AND DISCHARGE TOLERANT RECHARGEABLE BATTERY CELL AND PACK

STATEMENT OF GOVERNMENT SUPPORT

This invention was made with government support under contract W56HZV-12-C-0065, awarded by the United States Army, contract N39430-14-C-1506 awarded by the United States Navy, contract DE-SC0013739 awarded by the United States Department of Energy, and contract HQ0147-15-C-8003, awarded by the United States Defense Logistics Agency. The government has certain rights in the invention.

FIELD

This disclosure is related to lithium ion secondary cells and their uses.

BACKGROUND

Lithium-ion batteries are the primary power source for numerous portable electronic devices for a variety of reasons, including the high energy density, high specific energy, and long cycle life associated with the technology. However, commercially available lithium-ion cells present safety issues, especially when they are mechanically abused. They cannot be charged rapidly or at very low temperatures, and generally have poor performance at low temperatures. They are capable of violent safety failures, particularly when subjected to mechanical abuses that cause them to develop internal short circuits. They are sensitive to over-discharge and overcharge, and can exhibit undesirable performance loss and possibly an unsafe event if a battery, or a cell of a battery, is overcharged or over-discharged. Further, long term storage or shipment of commercially available lithium ion batteries can be problematic because of their sensitivity to over-discharge.

To avoid these and other safety issues, cells in currently available lithium-ion batteries are electronically monitored and their state of charge controlled, tasks that may be performed using a battery management circuit ("BMC"). In addition to avoiding over-discharge of a lithium-ion cell and to avoid degradation mechanisms such as copper dissolution, the battery management circuit can also provide overcharge protection. The cell monitoring and the state of charge control used in current lithium-ion batteries often exceeds that used in other rechargeable battery technologies, such as lead acid or nickel metal hydride batteries where in many applications a battery management circuit may be omitted.

While not wanting to be bound by theory, it is understood that the over-discharge susceptibility of current lithium-ion batteries arises from the combination of graphite anode material and the copper current collector materials used. Copper is used because it is not susceptible to electrochemical alloying with lithium at the electrochemical potential of the graphite. However, copper can be oxidized if the anode is driven to a high potential, which can occur if a cell is over-discharged. Oxidized copper is understood to redeposit in a fibrous form, which can be life-limiting and potentially result an internal short circuit if the cell is subsequently recharged.

For high power rechargeable battery applications, in particular where low-temperature performance and the ability to be recharged very rapidly is desirable, or where the battery must be capable of safely surviving extreme abuses, use of a technology that provides less energy density and/or less specific energy than a lithium-ion cell which employs a graphite or other low-potential anode material may be acceptable. For example, lead acid batteries are currently used for vehicle ignition and start-stop battery applications, e.g., "starting-lighting-ignition" (SLI) applications, despite the fact that they provide a fraction of the energy density and specific energy provided by lithium-ion batteries. However, if the duty cycle of a vehicle ignition or start-stop battery application is expanded and the battery is cycled over a greater state of charge range, the performance and life of lead acid batteries can be inadequate as the duty cycle of the application is extended beyond a classic starting-lighting-ignition (SLI) type duty cycle.

Thus, there remains a need for a battery technology that provides some of the desirable characteristics of lithium-ion batteries, such as long cycle life, and characteristics currently provided by lead acid SLI batteries, such as high power, rapid recharge, and low-temperature performance. Furthermore, a technology that provides improved safety, including the ability to safely endure extreme mechanical abuses and to be safely operated to 0 V, e.g., without external circuitry for over-discharge protection, is highly desirable.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Disclosed are rechargeable lithium ion cells and packs that are robust, very safe, exhibit high power delivery and acceptance capability, have long cycle life, excellent performance at high and low temperatures, are highly tolerant to mechanical abuse, and are storable for extended periods.

It was found that electrochemical cells of this disclosure are surprisingly tolerant to extreme mechanical abuse and continue to function as an electrochemical cell, i.e., supports charge and discharge, even after such mechanical abuse. Some aspects of the cells as provided herein are also capable of being discharged and charged at extreme low temperatures, stored at zero volts for extended periods of time without damage, are tolerant of overcharge without damage to the cell, or combinations thereof.

Cells as provided herein include a cathode formed of a polycrystalline cathode electrochemically active material defined by or including the formula $Li_{1+x}MO_{2+y}$, wherein $-0.9 \leq x \leq 0.3$, $-0.3 \leq y \leq 0.3$, and wherein M includes Ni at 80 atomic percent or higher relative to total M. The cathode electrochemically active material is also characterised by a non-uniform distribution of Co on, within, or throughout the particle. A cell further includes an anode including an anode electrochemically active material of the formula $Li_{4+a}Ti_5O_{12+b}$ wherein $-0.3 \leq a \leq 3.3$, $-0.3 \leq b \leq 0.3$, and wherein the anode and the cathode each independently include a current collector substrate formed of or including aluminium.

A cell may be in any configuration such as a cylindrical or pouch cell.

The anode and the cathode are in ionic contact with and separated by a separator. A separator may include or may be polymeric separator. In some aspects a separator may include a polyolefin. In some aspects, a separator may further include a ceramic coated on one or more of the separator surfaces, or embedded within the polymer, optionally at one or more of the separator surfaces. A ceramic may be a ceramic such as a ceramic oxide. In some aspects a separator is or includes an aluminium oxide.

The cells of the present disclosure have the capability of being configured in an anode limited fashion. As such, an area ratio of anode to cathode is optionally less than or equal to 1. In addition or alternatively, a capacity ratio of anode to cathode electrochemically active material is equal to or less than 1.

An electrolyte may be included where the electrolyte may include a solvent and a salt. Optionally a solvent is a carbonate solvent or combination of one or more carbonate solvents with other suitable materials. A salt is optionally a lithium salt, optionally $LiPF_6$ salt in a mixture of propylene carbonate, ethyl methyl carbonate, and methyl butyrate.

Anodes and cathodes may include a binder intermixed with the anode active material, the cathode active material. A binder is optionally a polymeric binder, optionally including or consisting of PVdF.

DRAWINGS

The electrochemical cells according to this disclosure may be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. The above and other aspects, advantages and features of this disclosure will become more apparent by describing in further detail exemplary embodiments thereof with reference to the accompanying drawings, in which:

DETAILED DESCRIPTION

Figure 1:
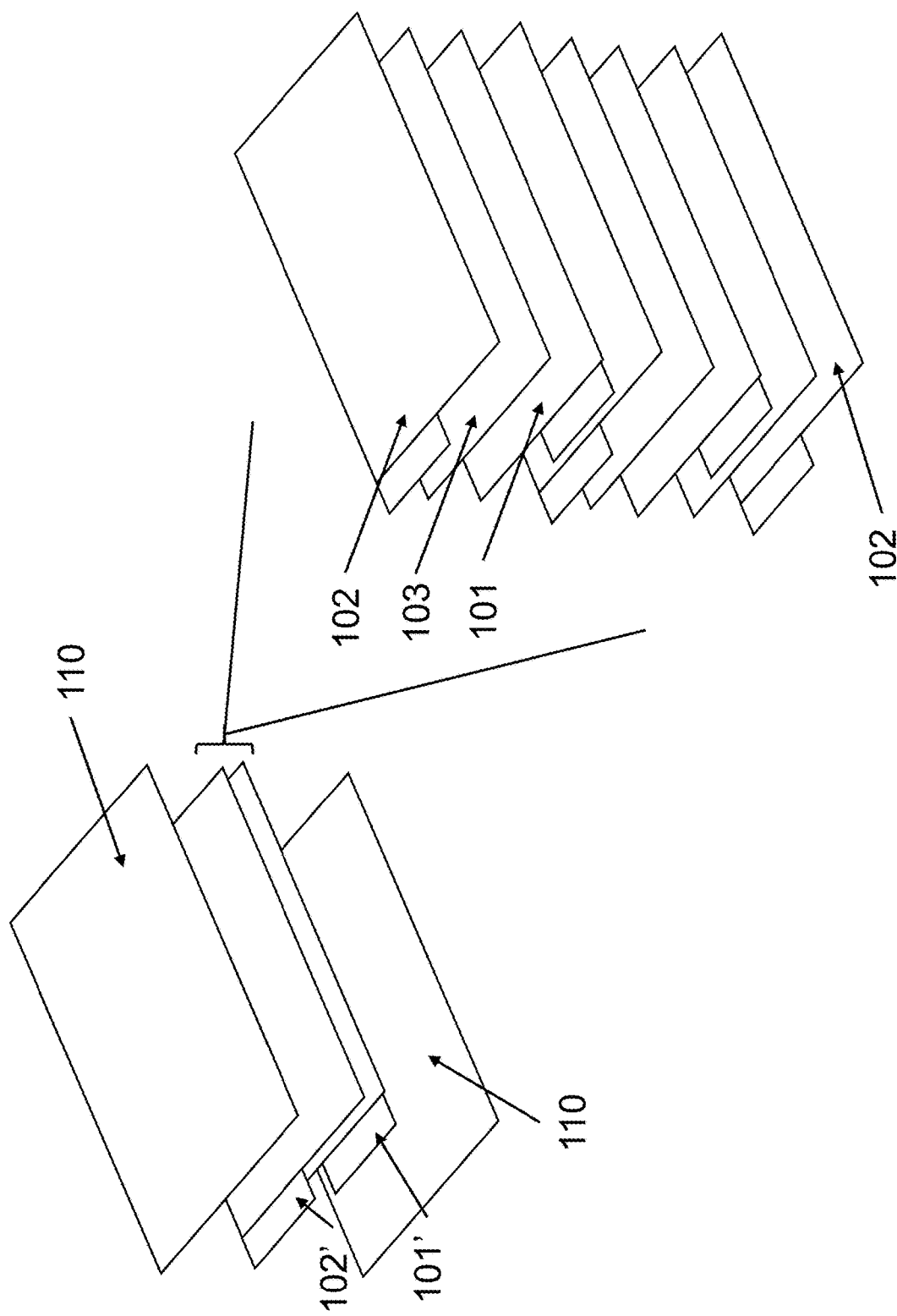
FIG. 1 is a schematic illustration of an embodiment of a lithium-ion cell with a detail of an electrode stack on the right side.

It was surprisingly discovered that lithium-ion cells of this disclosure including a positive electrode including a polycrystalline cathode electrochemically active material having a non-uniform distribution of cobalt, and a negative electrode including a negative electrochemically active material including a lithium titanate (LTO), optionally having an electrochemical redox potential of about 1.55 volts versus lithium, the negative electrode material and coated on an aluminum current collector, can safely survive extreme mechanical abuses such as nail penetration and round-bar crush. Unexpectedly, cells of this disclosure continue to function electrochemically without significant loss in performance after such abuse. In addition, the cells of this disclosure have unique capabilities of being acceptable of very high charge rates, have excellent recovery following long term storage in a deep discharge state (e.g. 0 V) and can be charged at a high rate (e.g. 1C) at very cold temperatures such as −40° C. or below. Thus, the cells of this disclosure address many issues with other battery systems and technologies by providing an exceptionally robust and safe battery system that can be used in many cell types, including pouch cells, and for many different applications.

As used herein, "absorbing" can mean: intercalation or insertion or conversion alloying reactions of lithium with the active materials. Absorbing may be referred to herein as "lithiation."

As used herein, "desorbing" can mean: de-intercalation or de-insertion or conversion de-alloying reactions of lithium with the active materials. Desorbing may be referred to herein as "delithiation."

As used herein, in the context of the lithium-ion cell, "cathode" means positive electrode and "anode" means the negative electrode.

As used herein an "active material" is a material that participates in electrochemical charge/discharge reaction of an electrochemical cell such as by absorbing or desorbing lithium.

The lithium-ion cells disclosed herein can be safely discharged to 0V without impacting their performance. These lithium-ion cells can also safely tolerate high degrees of overcharge and voltage reversal, the latter property enabling that batteries made from these cells connected in series can also be discharged to 0V without addressing the individual cells. Because the disclosed lithium-ion cells and batteries can be discharged to 0 V, numerous benefits are provided. For example, the disclosed lithium-ion cells and batteries may be stored and/or shipped in a discharged state to provide improved safety. Because of the cells' high tolerance for overcharge and over-discharge, batteries made from them can tolerate loss or failure of battery management while retaining performance and life at safe and useful levels. Also, the lithium-ion cells as provided herein can be charged extremely rapidly and at low temperatures without impacting their safety, performance, or life, making them well-suited for applications such as electrical load levelling and start-stop vehicle batteries. Furthermore, such lithium-ion cells have excellent stability at high temperatures and excellent performance at very low temperatures.

Without being limited to one particular theory, it is believed that the choice of anode structure and materials greatly assist in providing several of the unique characteristics of electrochemical cells as provided herein. One strategy to provide a lithium-ion battery that can be discharged to 0 volts, or stored in a discharged state while avoiding at least the degradation of the typically used copper current collector, is to use a metal in the current collector that is less susceptible to oxidation, such as titanium or stainless steel. However, titanium and stainless steel are less conductive than copper. For example, the conductivity of copper is over 20 times that of titanium. As a result, the rate capability of a cell using titanium or stainless steel instead of copper can be less than if copper were used. Accordingly, for some applications the rate capability provided by cells employing the titanium or stainless steel current collector is insufficient. While use of a titanium or stainless steel current collector may provide improved over-discharge performance, the use of titanium or stainless steel may render the cell unsuitable for applications where high power capability is desirable.

As provided herein, the issues with other metals typically used in a current collector are addressed by providing an electrochemical cell including a current collector for a negative electrode that includes or is made solely from a metal that is electrochemically reactive with lithium at a potential of less than 0.5 volt versus Li/Li$^+$, e.g., 0.1 volt to less than 0.5 volt versus Li/Li$^+$, such as aluminum. The provided aluminum current collector can be used in conjunction with a negative electrode electrochemically active material comprising an LTO because the electrochemical potential of the LTO is greater than the potential at which aluminum alloys with lithium. For example, LTO according to some aspects as provided herein has an electrochemical redox potential of 1.55 volts versus Li/Li$^+$, and this redox potential is greater than the potential at which aluminum alloys with lithium, 0.4 V versus Li/Li$^+$. Thus if the LTO having an electrochemical redox potential of 1.55 volts versus lithium is used, the challenges associated with copper, such as copper dissolution, can be avoided by using aluminum for the current collector of the negative electrode. Further, and while not wanting to be bound by theory, it is understood that a solid electrolyte interphase (SEI), which is understood to include electrolyte reduction products, is believed to not form on LTO because of its high potential relative to lithium. These properties, in combination with the ability to be safely discharged to 0 V, results in a lithium-ion cell with unexpectedly improved safety and stability.

Furthermore, because a negative electrode comprising the LTO having an electrochemical redox potential of 1.55 volts versus lithium has highly reversible Li intercalation with facile electrochemical kinetics, and a current collector comprising aluminum is relatively conductive, lithium-ion cells comprising such a negative electrode can provide high rate capability for both charge and discharge and excellent life.

As such, the electrochemical cells as provided herein include a negative electrode incorporating an LTO as an anode electrochemically active material wherein the LTO is coated on an aluminium current collector. In some aspects, a positive electrode also includes a polycrystalline cathode electrochemically active material coated on an aluminium current collector. An aluminium current collector is optionally in the form of a sheet formed of Al or an alloy of aluminium, and may be in the form of a foil, solid substrate, porous substrate, grid, foam or foam coated with Al, or other form known in the art. In some aspects an aluminium current collector is a foil. Optionally, a grid may include expanded metal grids and perforated foil grids.

The positive electrode also includes a current collector. The current collector for the positive electrode may be formed of aluminum, such as an aluminum alloy. An aluminium current collector is optionally in the form of a sheet, and may be in the form of a foil, solid substrate, porous substrate, grid, foam or foam coated with Al, or other form known in the art. In some aspects an aluminium current collector is a foil. Optionally, a grid may include expanded metal grids and perforated foil grids.

A current collector for an anode or a cathode is optionally associated with a tab that may be used to electrically connect the cell to a circuit for use. Each of an anode current collector and a cathode current collector may be electrically associated with a tab. A tab may be made of any suitable material such as aluminium or other material known in the art. A tab is optionally an uncoated area of the current collector. For stacked cells with multiple anodes and cathodes, the tabs may be welded together to form a single positive electrode tab and a single negative electrode tab for connection with an external circuit.

A cathode in an electrochemical cell as provided herein serves as the positive electrode. A cathode includes a polycrystalline cathode electrochemically active material that is capable of absorbing and desorbing Li. A cathode electrochemically active material as provided herein is a material of the formula $Li_{1+x}MO_{2+y}$, wherein $-0.9 \leq x \leq 0.3$, $-0.3 \leq y \leq 0.3$, and wherein M includes Ni at 80 atomic percent or higher relative to total M. A polycrystalline material includes an agglomeration or association of a plurality of crystallites to form the polycrystalline material. Within the polycrystalline material, each crystallite may have any suitable shape, which can be the same or different within each secondary particle of cathode electrochemically active material. Further, the shape of each crystallite can be the same or different in different particles. Because of its crystalline nature, the crystallite may be faceted, the crystallite may have a plurality of flat surfaces, and a shape of the crystallite may approximate a geometric shape. The crystallite may optionally be a polyhedron. The crystallite may have a rectilinear shape, and when viewed in cross-section, a portion of or an entirety of the crystallite may be rectilinear. The crystallite may be square, hexagonal, rectangular, triangular, or a combination thereof.

The cathode electrochemically active material includes Ni as a predominant of the M component. The amount of Ni in the first composition is optionally from 80 atomic percent to 100 atomic percent (at %) of total M. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 97 at %, 98 at %, 99 at %, 99.5 at %, 99.9 at %, or 100 at %.

In some aspects, M is Ni alone or in combination with one or more additional elements. The additional elements are optionally metals. Optionally, an additional element may include or be one or more of Al, Mg, Co, Mn, Ca, Sr, Zn, Ti, Y, Cr, Mo, Fe, V, Si, Ga, or B. In particular aspects, the additional element may include Mg, Co, Al, or a combination thereof. Optionally, the additional element may be Mg, Al, V, Ti, B, or Mn, or a combination thereof. Optionally, the additional element is selected from the group consisting of Mg, Al, V, Ti, B, or Mn. Optionally, the additional element selected from the group consisting of Mg, Co, and Al. Optionally, the additional element selected from the group consisting of Ca, Co, and Al. In some aspects, the additional element is Mn or Mg, or both Mn and Mg. Optionally, the additional element is Mn, Co, Al, or any combination thereof. Optionally the additional element includes Co and Mn. Optionally the additional element is Co and Al. Optionally the additional element is Co.

An additional element of M in the cathode electrochemically active material may be present in an amount of about 0.1 to about 20 at %, specifically about 5 to about 20 at %, more specifically about 10 to about 20 at % of M in the first composition. Optionally, the additional element may be present in an amount of about 1 to about 20 at %, specifically about 2 to about 18 at %, more specifically about 4 to about 16 at %, of M in the first composition. In some illustrative examples, M is about 80-100 at % Ni, 0-15 at % Co, 0-15 at % Mn, and 0-10 at % additional elements.

The cathode electrochemically active material as used in a cathode of a cell as provided herein includes Co wherein the Co is non-uniformly distributed through, on, or in the secondary particle of the cathode electrochemically active material. Non-uniform distribution is a distribution of Co that varies throughout some or all of the secondary particle. In some aspects, the polycrystalline material includes grain boundaries between adjacent crystallites within the secondary particle wherein a concentration of cobalt, aluminum, or both is higher in the grain boundary than in a center of the adjacent crystallites. Such, materials are considered grain boundary enriched materials. Illustrative examples of such grain boundary enriched materials can be found in U.S. Pat. No. 9,391,317 and U.S. patent application Ser. No. 16/250,762.

In particular aspects, a secondary particle as used as a cathode electrochemically active material has a Co, Al, or both enriched grain boundary, optionally where the mole fraction of Co, Al, or both in the grain boundary is higher than a mole fraction of Co, Al, or both in the crystallites optionally as averaged throughout the sum of each region.

The composition of the crystallites, grain boundary region or both optionally has layered $\alpha$-NaFeO$_2$-type structure, a cubic structure, or a combination thereof. An aspect in which the grain boundaries have the layered $\alpha$-NaFeO$_2$-type structure is specifically mentioned. Another aspect in which the grain boundaries with $\alpha$-NaFeO$_2$-type structure with defects is specifically mentioned. Another aspect in which parts of the grain boundaries have a cubic or spinel structure is specifically mentioned.

A grain boundary is optionally formed of a second composition of the formula I Li$_{1+x}$MO$_{2+y}$ (Formula 1) wherein $-0.9 \leq x \leq 0.3$, $-0.3 \leq y \leq 0.3$, and wherein M includes Co, Al, or a combination of Co and Al. Optionally M in a second composition further includes Ni. Optionally, the Ni component of M in the second composition is less than or equal to 1 at %. Optionally, the Ni component of M is less than or equal to 5 at %. Optionally, the Ni component of M is less than or equal to 10 at %. Optionally, the Ni component of M is less than or equal to 20 at %. Optionally, the Ni component of M is less than or equal to 75 at %. Optionally, the Ni component of M is less than or equal to 80 at %. Optionally, the Ni component of M is less than or equal to 90 at %. Optionally, the Ni component of M is less than or equal to 95 at %. Optionally, the Ni component of M is less than or equal to 98 at %. Optionally, the Ni component of M is less than or equal to 99 at %.

In a grain boundary enriched cathode electrochemically active material, the concentration of Co, Al, or both averaged through the grain boundary region is higher than the average concentration of Co, Al, or both averaged through the crystallite region. As such, the mole fraction of Co, Al, or both in the grain boundary is higher than the mole fraction of Co, Al, or both in the crystallites. The mole fraction of Co, Al, or both in the first composition, if Co, Al, or both are present at all in the crystallites, as defines the composition of the crystallites is lower than the mole fraction of the total Co or Al independently or combined in the total particle composition as determined by ICP. The mole fraction of Co and Al independently or combined in the crystallites can be zero. The mole fraction of Co and Al in the second composition independently or combined as defines the grain boundary is higher than the mole fraction of Co and Al independently or combined in the total particle as measured by ICP. The second composition may be enriched of Co of at or between 0 at % and 8 at %, optionally at or between 3 at % and 5 at % Co and optionally could be supplemented with 0.01 at % to 10 at % Al, optionally 1.5 at % or less Al.

Optionally a second composition and a first composition (crystallite composition) are identical with the exception of the presence of or increased concentration (mole fraction) of Co, Al, or both in the second composition relative to the first composition.

A cathode electrochemically active material optionally includes a non-uniform distribution of Co within the secondary particle wherein the non-uniform distribution is in the form of a gradient of Co within a crystallite, within the total secondary particle, or combinations thereof. Optionally, the crystallites include a gradient of Co concentration where the amount of Co at or near the outer periphery of a crystallite is greater than the concentration of Co at or near a center of the crystallite. Illustrative examples of such materials can be found in Lim, et al., *Adv. Funct. Mater.* 2015; 25:4673-4680 or in Lee et al., *Journal of Power Sources,* 2015; 273:663-669.

In some aspects, a non-uniform distribution of Co is achieved by coating a core with Co such as described in U.S. Pat. No. 7,381,496, U.S. Patent Application Publication No: 2016/0181611, or Zuo, et al., *Journal of Alloys and Compounds,* 2017; 706:24-40.

The positive electrode may be provided by combining the lithium nickel oxide, a conductive agent, and a binder, and providing a coating comprising the lithium nickel oxide, the conductive agent, and the binder on the current collector. The conductive agent may be any conductive agent that provides suitable properties and may be amorphous, crystalline, or a combination thereof. The conductive agent may include a carbon black, such as acetylene black or lamp black, a mesocarbon, graphite, carbon fiber, carbon nanotubes such as single wall carbon nanotubes or multi-wall carbon nanotubes, or a combination thereof.

A binder as used in either an anode or a cathode may be any binder that provides suitable properties and may include but not be limited to polyvinylidene fluoride, a copolymer of polyvinylidene fluoride, polyvinylidene difluoride (PVdF), hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof.

The positive electrode may be manufactured by combining the lithium nickel oxide, the conductive agent, and the binder in a suitable ratio, e.g., 80 to 98 weight percent of the lithium nickel oxide, 2 to 20 weight percent of the conductive agent, and 2 to 10 weight percent of the binder, based on a total weight of the lithium nickel oxide, the conductive agent, and the binder. The lithium nickel oxide, the conductive agent, and the binder may be suspended in a suitable solvent, such as N-methylpyrrolidinone or other suitable solvent, and disposed on a suitable substrate, such as aluminum foil, and dried in air to provide the positive electrode.

An electrochemical cell as provided herein further includes a negative electrode. The negative electrode includes a lithium titanium oxide (LTO), optionally having an electrochemical redox potential of about 1.5 V versus lithium. The lithium titanium oxide may have a spinel type structure.

An anode includes an anode electrochemically active material optionally of the formula $Li_{4+a}Ti_5O_{12+b}$ (2) wherein $-0.3 \leq a \leq 3.3$, $-0.3 \leq b \leq 0.3$. In some aspects the lithium titanium oxide may be of the formula 3

$$Li_{4+y}Ti_5O_{12}, \quad (3)$$

wherein, $0 \leq y \leq 3$, $0.1 \leq y \leq 2.8$, or $0 \leq y \leq 2.6$.

Alternatively, the lithium titanium oxide may be of Formula 4.

$$Li_{3+z}Ti_{6-z}O_{12}, \quad (4)$$

where in formula 4, $0 \leq z \leq 1$. Optionally $0 \leq z \leq 1$, $0.1 \leq z \leq 0.8$, or $0 \leq z \leq 0.5$. A combination of anode electrochemically active materials including at least one of the foregoing lithium titanium oxides may be used. In some aspects an anode electrochemically active material includes or is $Li_4Ti_5O_{12}$ having an electrochemical redox potential of about 1.55 V versus lithium.

The lithium titanium oxide may have any suitable particle size, such as a particle size of 0.1 μm to 100 μm, or 1 μm to 10 μm.

The lithium titanium oxide may have high specific surface area (SSA), such as 4 m²/g to 20 m²/g, or 7 m²/g to 13 m²/g.

The negative electrode includes a current collector. As is further discussed above, and while not wanting to be bound by theory, it is understood that because the electrochemical potential of the lithium titanium oxide is above 1 volt versus $Li/Li^+$, the negative electrode current collector may include a metal other than copper because other metals, such as aluminum and titanium provide suitable stability at the potentials present when a lithium titanium oxide having an electrochemical redox potential of above 1 volt versus $Li/Li^+$ is used. While not wanting to be bound by theory, it is understood that metals such as aluminum are electrochemically reactive with lithium at a potential of 0.1 volt to 0.5 volt versus lithium, whereas copper is not, which is why copper is used as a current collector material when graphite is used as an anode material. Thus a current collector comprising a metal which is electrochemically reactive with lithium at a potential of 0.1V to 0.5V, 0.15V to 0.45V, or 0.2V to 0.4V versus lithium may not be used for a graphite anode material, but may be used for an LTO anode material.

The current collector of the anode, cathode, or both may include aluminum, with aluminum or aluminum alloy being mentioned. Representative aluminum alloys include aluminum alloys 1050, 1100, 1145, 1235, 1350, 3003, 3105, 5052, and 6061.

The negative electrode may be formed by combining the LTO, a conductive agent, and a binder, and providing a coating comprising the LTO, the conductive agent, and the binder on the current collector selected for the negative electrode. The conductive agent may be any conductive agent that provides suitable properties and may be amorphous, crystalline, or a combination thereof. The conductive agent may be a carbon black, such as acetylene black or lamp black, a mesocarbon, graphite, carbon fiber, carbon nanotubes such as single wall carbon nanotubes or multi-wall carbon nanotubes, or a combination thereof. The binder may be any binder that provides suitable properties and may comprise polyvinylidene fluoride, PVdF, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The negative electrode may be manufactured by combining the LTO, the conductive agent, and the binder in a suitable ratio, e.g., 80 to 98 weight percent of the LTO, 2 to 20 weight percent of the conductive agent, and 2 to 10 weight percent of the binder, based on a total weight of the LTO, the conductive agent, and the binder. The LTO, the conductive agent, and the binder may be suspended in a suitable solvent, such as N-methylpyrrolidinone, and disposed on a suitable current collector, such as aluminum, titanium, or stainless steel, and dried in air to provide the negative electrode.

The positive and negative electrodes may be prepared at loadings (masses of coated material per unit area of current collector) that are tailored to the required rate capabilities and the voltage ranges of specific applications. Higher power (high rate) applications require lower loading electrodes so as to maximize electrode interfacial surface area and minimize current density, while applications needing higher energy density require higher loading electrodes so as to minimize the cell's content of inactive materials such as current collectors and separators.

A further advantage of LTO anode optionally having an electrochemical redox potential of about 1.55 volts versus lithium is that it can be implemented in anode-limited cell designs because its potential is sufficiently positive to avoid the possibility of lithium metal plating under all but the most extreme overcharge conditions. Such anode-limited cell designs can enhance the overcharge tolerance and stability of the cell by limiting delithiation of the charged cathode to that level commensurate with the per-cell voltage required by a specific application. As such, an electrochemical cell as provided herein is optionally limited in either area, loading, or other.

Optionally, an electrochemical cell is anode limited as the geometric surface area of the cathode is optionally greater than or equal to the geometric surface area of the anode. As such an area ratio equal to the negative electrode area divided by the positive electrode area is less than or equal to 1. Optionally, the area ratio of the anode to the cathode is less than or equal to 0.99, 0.98, 0.97, 0.96, 0.95, 0.94, 0.93, 0.92, 0.91, 0.90, 0.85, 0.80, 0.75, 0.70, 0.65, 0.60, 0.55, or 0.50. In some aspects, the geometric area of the positive and negative electrodes is identical or substantially identical.

Optionally, a capacity ratio of the anode to the cathode is less than or equal to 1. The electrode capacity ratio is the ratio of the negative electrode capacity to the positive electrode capacity. The capacity of an electrode is often given as a charge-time product per unit area. The units of charge and time used are not important in the ratio calculation. The capacity of an electrode is equal to the capacity per unit area multiplied by the electrode area. Hence, for similar area of the two electrodes, the capacity ratio is equal to the ratio of the capacitances per unit area of the two electrodes. Optionally, the capacity ratio of the anode to the cathode is less than or equal to 0.99, 0.98, 0.97, 0.96, 0.95, 0.94, 0.93, 0.92, 0.91, 0.90, 0.85, 0.80, 0.75, 0.70, 0.65, 0.60, 0.55, or 0.50.

In some aspects of the provided electrochemical cell, a unit cell comprises one anode, one cathode, and a separator positioned between the anode and the cathode, wherein an electrolyte is provided in ionic contact with the anode and the cathode. Optionally, a unit cell includes a double sided anode wherein the anode electrochemically active material is coated on both sides of a current collector, or wherein a cathode is a double sided cathode where a current collector is coated on both sides by a cathode electrochemically active material. The two sided electrode may be flanked on both sides by two single sided opposing electrodes, or another opposing double sided electrode. In this way, a stack of electrodes may be provided to form the unit cell. In some aspects, a two single-sided anode electrodes incorporating LTO coated onto aluminum current collector, polyolefin separators, and a double-sided cathode electrode coated onto both sides of an aluminum current collector are provided. Such unit cells are stacked to form the electrochemical cell. In some aspects, single sided anode electrodes are positioned at the extremities of such a stack, but it is appreciated that the terminal electrodes of a stack may be cathodes.

The positive, the negative electrode, and a separator may be combined in a housing to provide a lithium-ion cell, an embodiment of which is illustrated in FIG. 1. The lithium-ion cell 100 includes: a positive electrode 101 with a positive electrode tab 101'; a negative electrode 102 with a negative electrode tab 102'; and a separator 103 interposed between the positive electrode 101 and the negative electrode 102. The cell may include an electrolyte in ionic contact with both the anode and the cathode. Ionic contact means that an electrolyte may transmit an ion from the anode to the cathode or from the cathode to the anode.

An electrochemical cell includes a separator positioned between the anode and the cathode in the unit cell. The separator may be formed from a microporous membrane, optionally a porous film including a polyolefin such as polypropylene, polyethylene, or a combination thereof. In some aspects, a separator may further include a coating or micro-particulate reinforcing filler of a ceramic oxide material, optionally aluminum oxide. A high permeability separator with Gurley air permeability of less than 200 seconds per 100 cc may be chosen to provide the cell with high power capability.

The anode, cathode, separator, and electrolyte may be housed in a cell case (e.g. housing). The cell case 110 may be a metal can, or can be a laminate film, such as a heat-sealable aluminum foil, such as an aluminum coated polypropylene film. As such, an electrochemical cell as provided herein may be in any known cell form, illustratively, a button cell, pouch cell, cylindrical cell, or other suitable configuration. In some aspects, a housing in is in the form of a flexible film, optionally a polypropylene film. Such housings are commonly used to form a pouch cell. The lithium-ion cell may have any suitable configuration or shape, and may be cylindrical or prismatic.

A cell as provided herein optionally excludes any circuitry such as a battery management circuit or other means capable of regulating charge rate or extent of charge or discharge and used in the art.

The lithium-ion cell includes an electrolyte that contacts the positive electrode 101, the negative electrode 102, and the separator 103. The electrolyte may include an organic solvent and a lithium salt. The organic solvent may be a mixture of cyclic carbonates and linear carbonates and esters. Representative organic solvents include ethylene carbonate, propylene carbonate, ethyl methyl carbonate, diethyl carbonate, dimethyl carbonate, methyl acetate, ethyl acetate, methyl propionate, ethyl propionate, methyl butyrate, or a combination thereof. A mixture of propylene carbonate, ethyl methyl carbonate and methyl butyrate is mentioned.

Representative lithium salts used in an electrolyte include but are not limited to $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. A combination including at least one of the foregoing salts and solvents can be used. The concentration of the lithium salt can be 0.1 to 2 molar (M) in the electrolyte. A solution of 1 M $LiPF_6$ is mentioned.

The electrolyte may be formulated to provide high power capability and low-temperature performance. Such an electrolyte may have ionic conductivity above 8 mS/cm at 25° C. and above 1 mS/cm at −40° C.

A battery made from the lithium-ion cells may include any suitable number of cells, for example, 1 to 50,000 cells, 2 to 25,000 cells, 4 to 15,000 cells, 8 to 5,000 cells, 16 to 2,000 cells, or 32 to 1,000 cells. The cells may be connected in any suitable configuration, including a serial connection, a parallel connection, or a combination thereof.

The charging and discharging of the cells and battery made from them may comprise any suitable method of charge and discharge, and may comprise charge and discharge at any suitable rate, such as a rate of 100C or less, 10C or less, 0.01C to 10C, or 0.1C to 1C. A C rate is a discharge rate of a cell, and is obtained by dividing a total capacity of the cell by a total discharge period of time, e.g., a C rate for a battery having a discharge capacity of 1.6 ampere-hours would be 1.6 amperes. The discharging may comprise discharging the battery to 1.4 V or less, optionally 1.3 V or less, optionally 1.2 V or less, optionally 1.1 V or less, optionally 1.0 V or less, optionally 0.9 V or less, optionally 0.8 V or less, optionally 0.7 V or less, optionally 0.6 V or less, optionally 0.5 V or less, optionally 0.4 V or less, optionally 0.3 V or less, optionally 0.2 V or less, optionally 0.1 volt or less, e.g., 0.1V to 0.001V, 0.05V to 0.005V. Discharging is optionally to 0 V or less.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

A positive electrode was manufactured by coating a mixture of a cobalt grain boundary enriched LNO-type lithium nickel oxide with nominal composition of $Li_{1.01}Mg_{0.025}Ni_{0.88}Co_{0.12}Al_{0.0064}O_2$ (CAMX Power, LLC, Lexington, Mass.), acetylene black, and polyvinylidene difluoride (PVdF) in a weight ratio of 94:3:3 on aluminum at an active material loading of 11.3 mg/cm². A negative electrode was manufactured by coating a mixture of lithium titanium oxide of nominal composition of $Li_4Ti_5O_{12}$ and having 10 m²/g specific surface area, acetylene black, and PVdF in a weight ratio of 90:3:7 on aluminum at an active material loading of 12.7 mg/cm². For both the positive and negative electrodes, acetylene black with a surface area of 100 m²/g (from Denka Carbons, as Denka AB-100) and the PVdF with molecular weight in range of 1,000,000-1,200,000 mol/g (from Solvay Chemicals as Solef 5130) were used.

The positive and negative electrodes had equal geometric area of 72.7 cm². 12 layers of double-sided positive electrode were stacked with 11 layers of double-sided and 2 layers of single-sided negative electrode in a Z-folded separator assembly. The separator was a 21 µm thick alumina-coated polyolefin material having Gurley air permeability of 110 seconds. The electrode stack assembly was placed in an aluminum-coated polypropylene envelope with the electrode tabs feeding through the package's edge seal, and an electrolyte consisting of 1 M $LiPF_6$ in a mixture of propylene carbonate, ethyl methyl carbonate, and methyl butyrate in a weight ratio of 1:1:2 and having ionic conductivity of 11 mS/cm at 25° C. and 2 mS/cm at −40° C. was added before sealing to provide a 3 ampere-hour (Ah) laminate-packaged prismatic cell weighing 82 g.

The cell was cycled at room temperature between 2.75 V and 1.4 V at various rates. It was also cycled at −50° C. between 3.0 V and 1.2 V at various rates.

Figure 2:
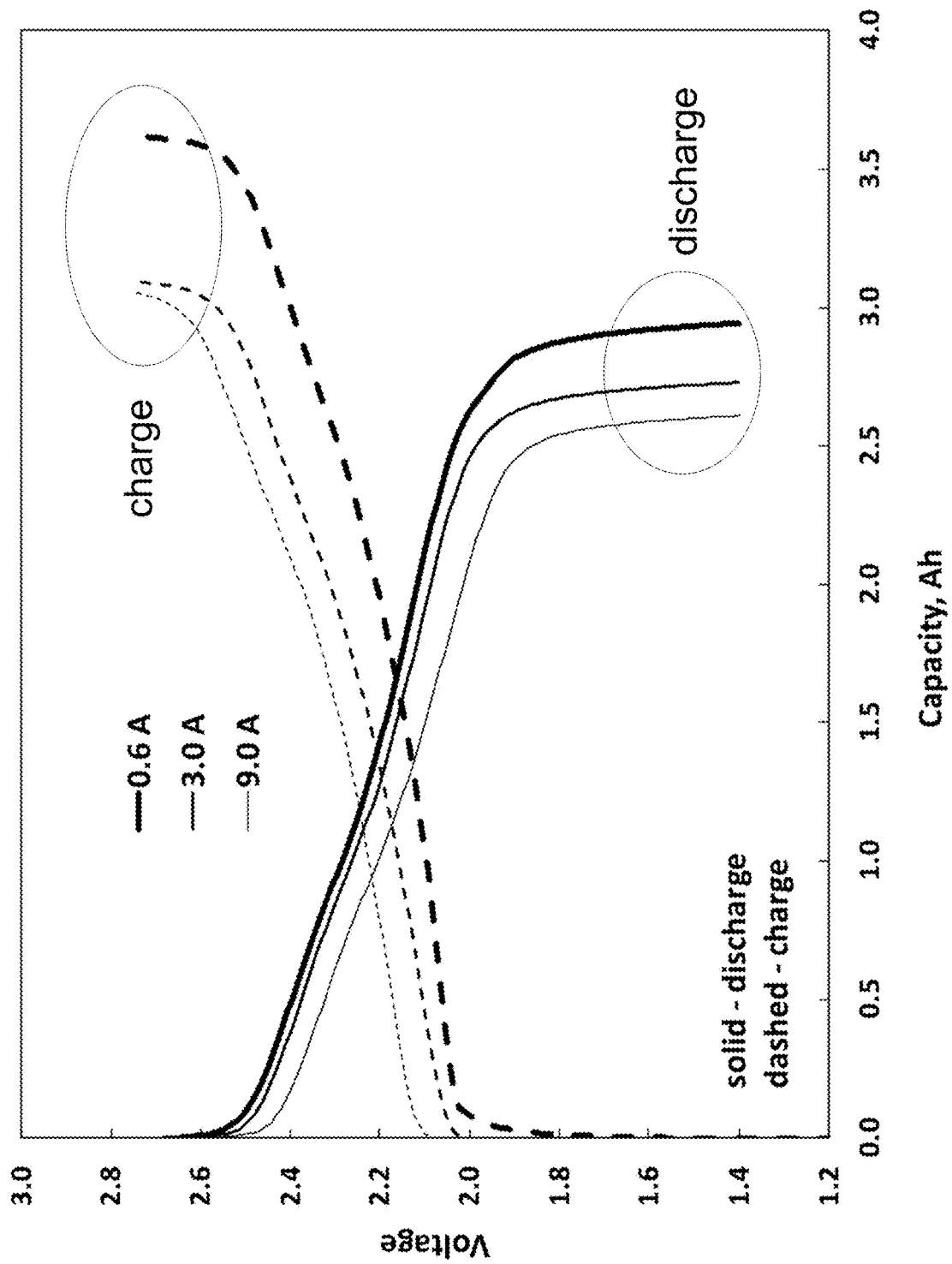
FIG. 2 illustrates voltage (volts, V) versus capacity (ampere-hours, Ah) for various rate charges and discharges at room temperature of a cell according to some aspects as provided herein.

FIG. 2 is a graph of cell voltage (volts, V) versus capacity (ampere-hours, Ah) illustrating voltage profiles of the cell's first charge and discharge at 0.6 A rate and subsequent charges and discharges at 3 A and 9 A rates, performed at room temperature. The 0.6 A first charge voltage profile show an upturn at about 2.55 V characteristic of the anode-limited charge capacity of this design. The cell has high rate capability, as demonstrated by the modest increases in voltage polarization as the current is increased from 0.6 A (C/5) to 9 A (3C).

Figure 3:
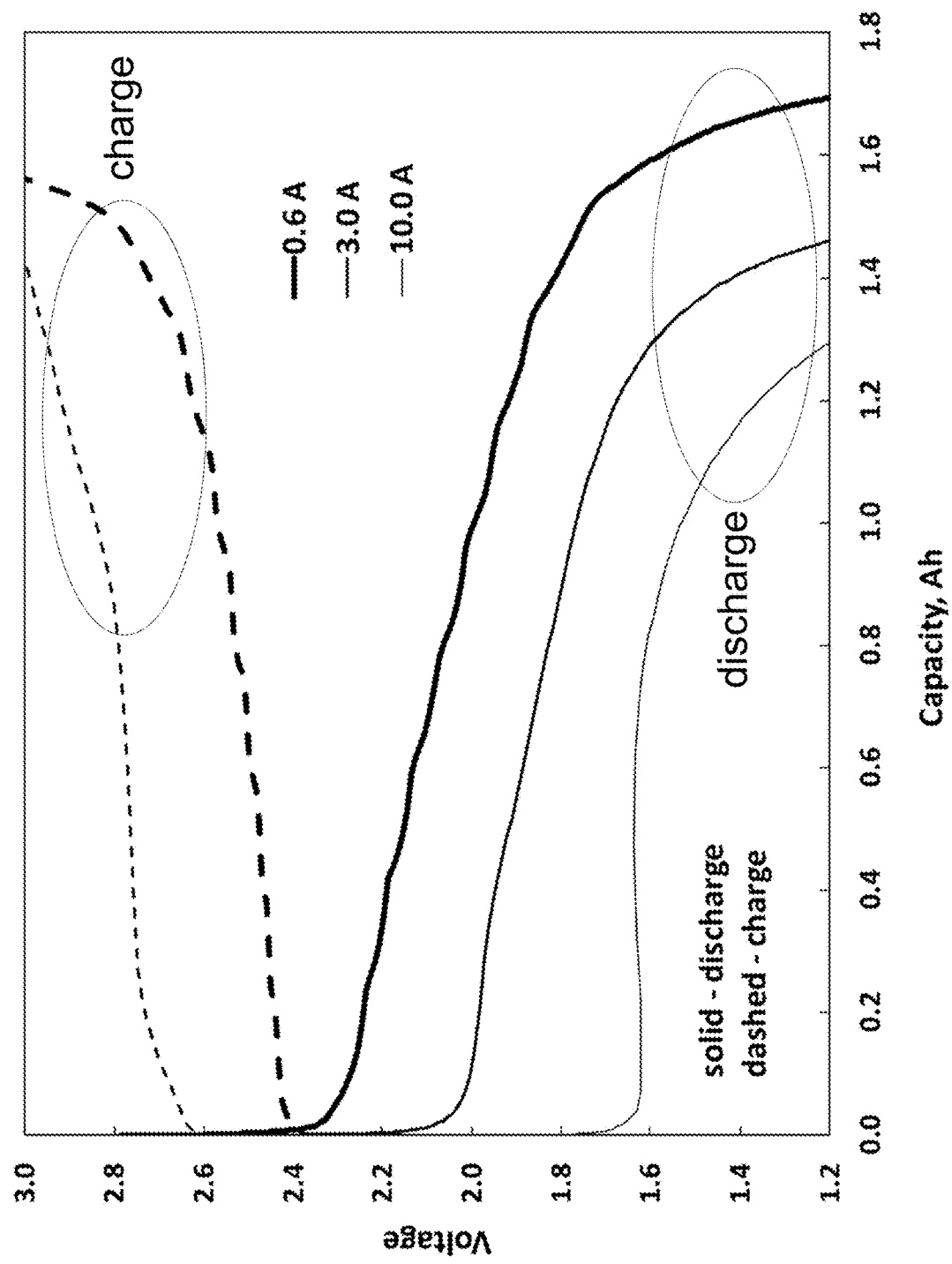
FIG. 3 illustrates voltage (volts, V) versus capacity (ampere-hours, Ah) for various rate charges and discharges at −50° C. of a cell according to some aspects as provided herein.

FIG. 3 is as graph of cell voltage (volts, V) versus capacity (ampere-hours, Ah) illustrating voltage profiles for the cell being charged and discharged at varied rates at −50° C., demonstrating a high level of performance at a temperature far outside the range accessible with conventional lithium-ion battery technology. The voltage limits are expanded relative to those for cycling at room temperature (FIG. 4) to accommodate the higher voltage polarization at this extreme low temperature. The cell delivers well over half its capacity when discharged at 0.6 A, and over 40% of its capacity when discharged at 10C. Remarkably, the cell can be charged to almost half its capacity at 3 A (1C) rate within the 3 V charging voltage limit.

Example 2

Two 120 mAh laminate-packaged prismatic cells were made using the materials and methods of Example 1 but with the following differences:

The positive electrode active material loading was 9.0 mg/cm² and the negative electrode active material loading was 9.4 mg/cm². The individual cathode and anode pieces were both 10.2 cm² in area, and were assembled in a stack with 5 layers of double-sided positive electrode, and 4 layers of double-sided plus 2 layers of single-sided negative electrode. The cells were first cycled at room temperature between 2.43 V and 1.33 V, corresponding to a 6-series-cell battery being cycled between 14.6 V and 8.0 V. They were then cycled 1,000 times between 2.43 V and 1.33 V in a 45° C. oven at 1.2 A (10C) charge rate and 1.2 A (10C) discharge rate. The cells were free-standing during this cycling, without having any external fixturing for maintaining stack pressure if they were to gas. Inspection and measurements of the cells after cycling was completed showed no evidence of them having evolved any gasses.

Figure 4:
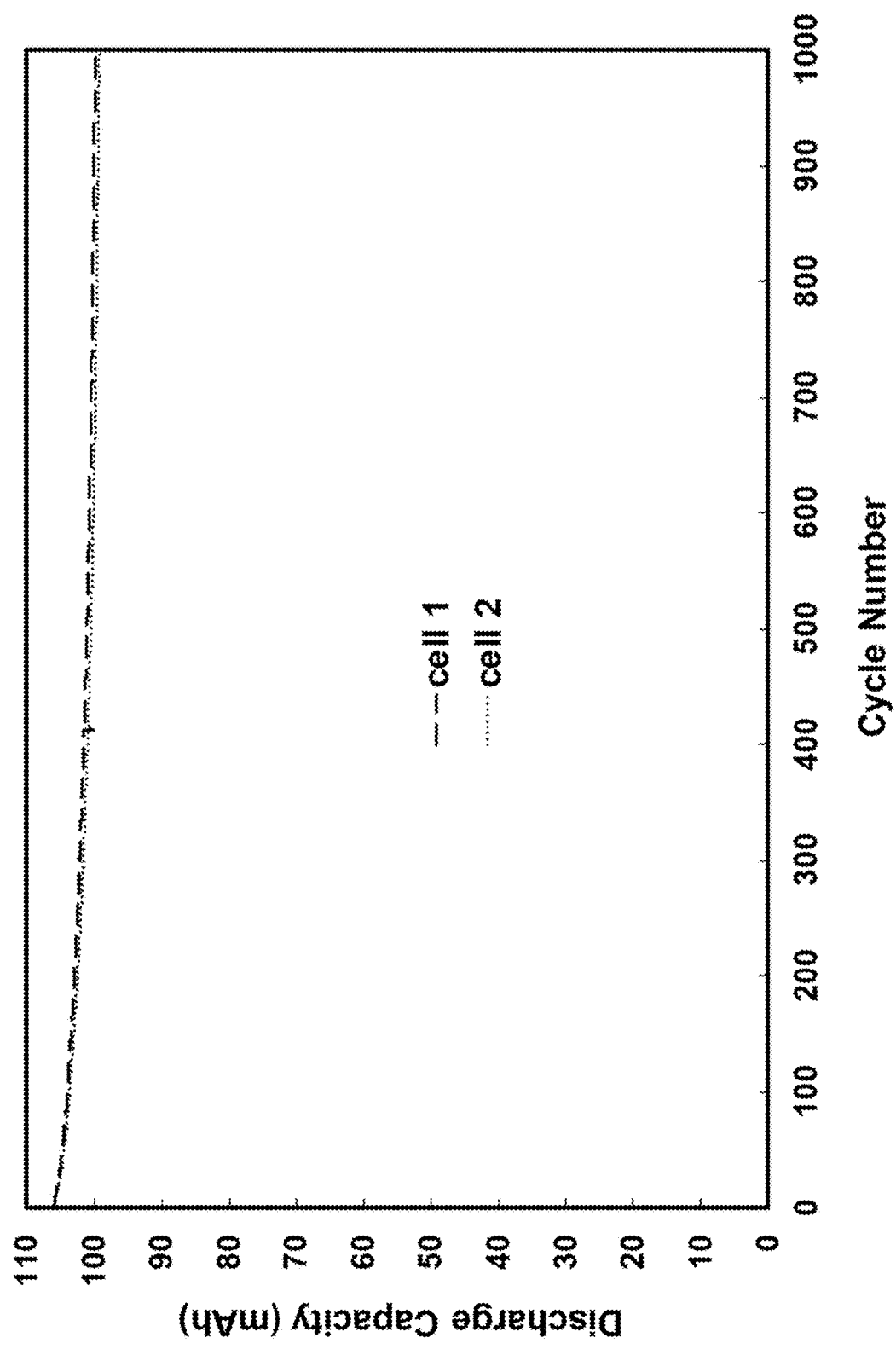
FIG. 4 illustrates cell discharge capacity (mAh) versus cycle number for high-rate cycling of 2 cells of according to some aspects as provided herein at 45° C.

FIG. 4 is a graph of the 10C discharge capacities for both cells vs. the cycle number during cycling at 45° C., and shows that the capacity delivered by the cells declined by only about 5% over the course of this aggressive cycling regime, demonstrating that the cells had excellent elevated-temperature stability and that they were undamaged by repeated rapid charging.

Example 3

A 325 mAh laminate-packaged prismatic cell designed for very high power capability was made using the materials and methods of Example 1 but with the following differences:

The positive electrode active material loading was 3.6 mg/cm² and the negative electrode active material loading was 3.7 mg/cm². The individual cathode and anode pieces were 10.2 cm² in area, and were assembled in a stack with 36 layers of double-sided positive electrode, and 35 layers of double-sided plus 2 layers of single-sided negative electrode. The separator was a 6 µm thick polyolefin material having Gurley air permeability of 100 seconds. The finished cell weighed 13.5 g and had 7.2 cc volume.

Figure 5:
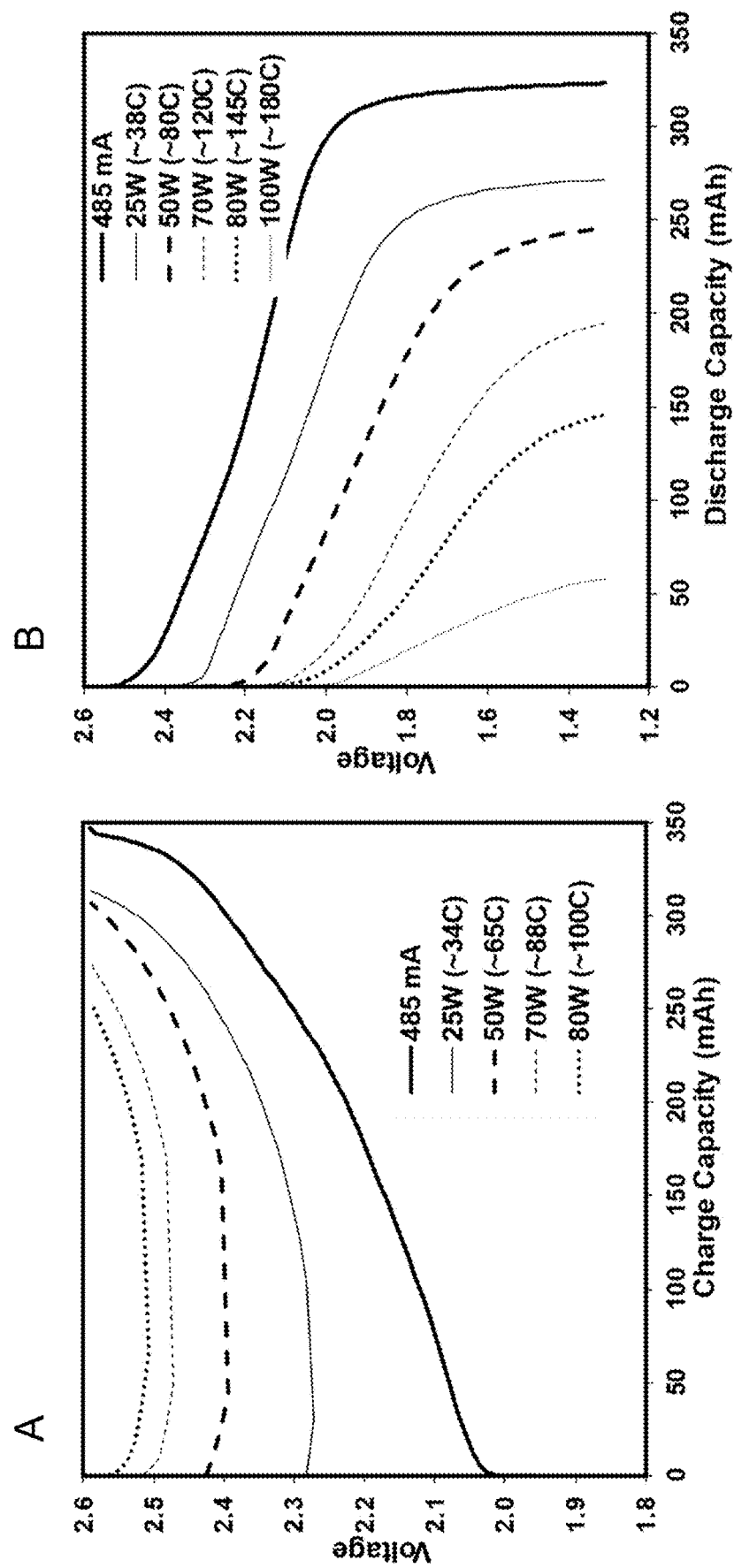
FIG. 5 illustrates voltage (volts, V) versus capacity (mAh) for charge (A) and discharge (B), respectively, of a cell according to some aspects as provided herein at various constant powers at room temperature.

The cell was cycled at room temperature between 2.59 V and 1.31 V, corresponding to an 11-series-cell battery being cycled between 28.5 V and 14.4 V, at various constant power levels. FIG. 5 shows 2 graphs of voltage (volts, V) versus capacity (mAh) for charging and discharging, respectively, of the cell at various power levels, and displays the remarkably high power capability of the cell. At 80 W constant power, corresponding to over 5 kW/kg constant specific power and over 11 kW/l power density, the cell sustains continuous charging for nearly 30 seconds, and sustains continuous discharge for about 11 seconds, delivering about 45% of its capacity and 18.5 Wh/kg, constituting about 35% of its total energy content.

Example 4

A 3-electrode, 130 mAh laminate-packaged prismatic cell containing a Li metal reference electrode was made using the materials and methods of Example 1 but with the following differences:

The positive electrode active material loading was 9.1 mg/cm$^2$ and the negative electrode active material loading was 10.0 mg/cm$^2$. The individual cathode and anode pieces were 10.2 cm$^2$ in area, and were assembled in a stack with 5 layers of double-sided positive electrode, and 4 layers of double-sided plus 2 layers of single-sided negative electrode.

The cell's performance was characterized at room temperature and at −18° C. by constant current continuous and pulse charge/discharge cycling between 2.59 V and 1.31 V, and the cathode potential was monitored by measuring the positive vs. Li metal reference electrode voltage as the cell was cycled, with the anode (negative electrode) potential being calculated by the difference between the cathode potential and the cell voltage. The cell was then discharged to 0V and held at that voltage for 24 hours, after which it was subjected to voltage reversal by over-discharging it by an additional 5% of its capacity (6.5 mAh) at a 0.1C rate (i.e., 13 mA discharge for 30 minutes). After being reversed, the cell was recharged and its performance was characterized again.

Figure 6:
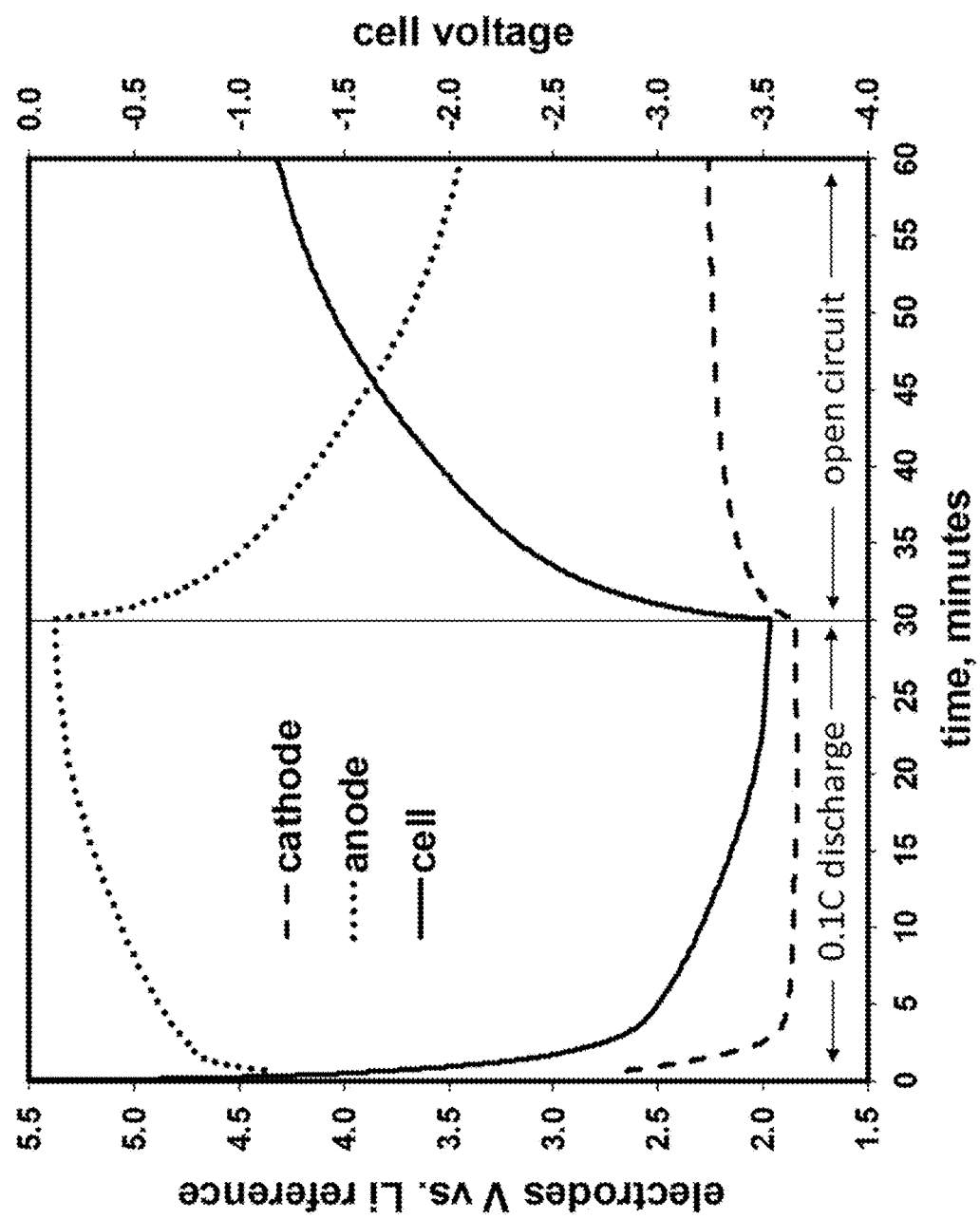
FIG. 6 illustrates cell voltage (volts, V) and electrodes V vs. Li reference (volts, V) versus time elapsed (minutes) for voltage reversal of a cell according to some aspects as provided herein at room temperature.

FIG. 6 is a graph of the electrode potential (V vs. Li reference) and cell voltage vs. time (minutes) for the 30-minute duration cell over-discharge and a subsequent 30-minute relaxation at open circuit. The graph shows that the cell voltage reversed and reached about −3.5 V, and that the cathode and anode potentials reached about 1.9 V vs. Li and 5.4 V vs. Li, respectively. At open circuit, the cell voltage increased rapidly, primarily due to rapid decrease of the high anode potential, while the low cathode potential rose much more slowly, showing that voltage polarization at the anode was greater than that at the cathode during over-discharge and cell reversal, and indicting that the charge passed by the cathode during over-discharge was associated with a reversible Faradaic process.

Figure 7:
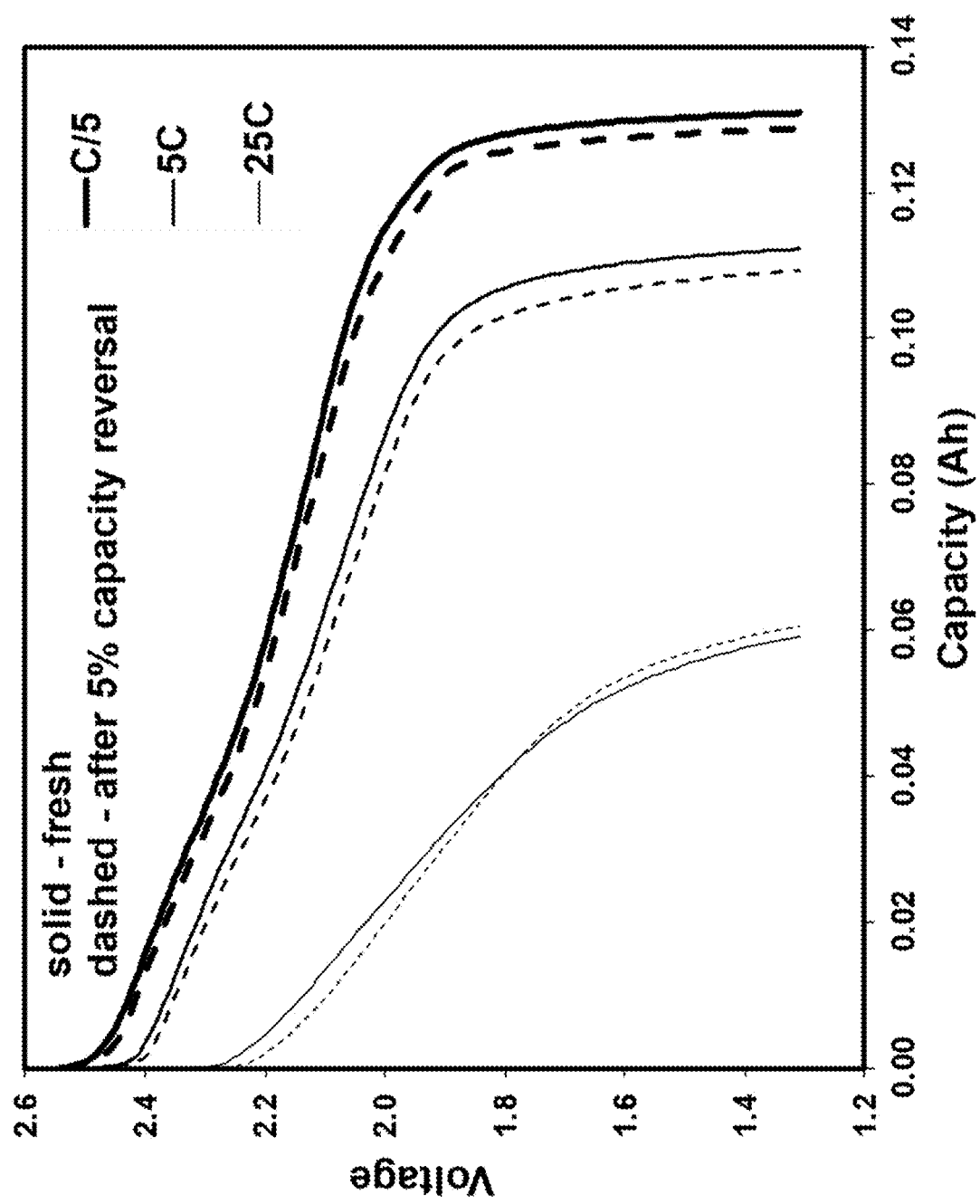
FIG. 7 illustrates voltage (volts) versus capacity (Ah) for discharges of a cell according to some aspects as provided herein at room temperature before and after it was reversed.

FIG. 7 is a graph of voltage (volts) versus capacity (Ah) for various rate discharges of the cell at room temperature before and after it was reversed, and shows that the impact of 5% capacity reversal on room-temperature discharge characteristics was minimal.

Figure 8:
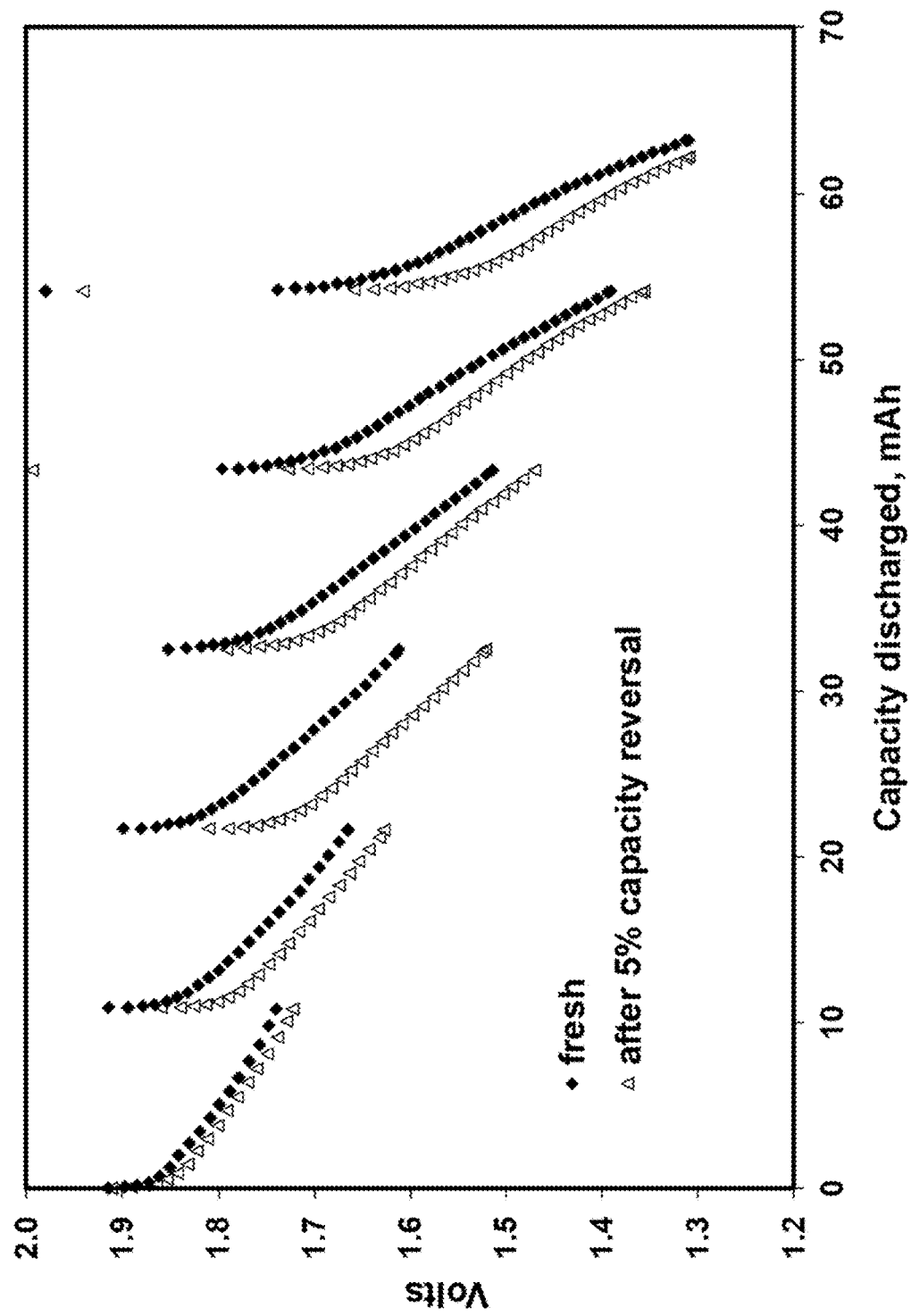
FIG. 8 illustrates voltage (volts) versus capacity discharged (mAh) for repeated high rate pulse discharges at −18° C. of a cell according to some aspects as provided herein before and after it was reversed.

FIG. 8 is a graph of voltage (volts) versus capacity (mAh) for consecutive 10C (1.3 A), 30 second duration pulse discharges of the cell at −18° C. before and after it was reversed. The cell rested at open circuit for 30 minutes after each pulse (before the next pulse) to ensure that it did not self-heat appreciably during the test. The cell was able to support this aggressive low-temperature pulsing across 50% of its state of charge range (65 mAh) both before and after being reversed, showing that the impact of 5% capacity reversal on low-temperature pulse power performance was minimal.

Example 5

A 3-electrode, 130 mAh laminate-packaged prismatic cell containing a Li metal reference electrode was made using the materials and methods of Example 4. The cell's performance was characterized at room temperature and at −18° C. by constant current continuous and pulse charge/discharge cycling between 2.59 V and 1.31 V, and the cathode potential was monitored by measuring the positive vs. Li metal reference electrode voltage as the cell was cycled, with the anode (negative electrode) potential being calculated by the difference between the cathode potential and the cell voltage. The cell was then charged to 2.59 V, after which it was overcharged by an additional 10% of its capacity (13 mAh) at a 0.1C rate (i.e., 13 mA charge for 60 minutes). After being overcharged, the cell was discharged and its performance was characterized again.

Figure 9:
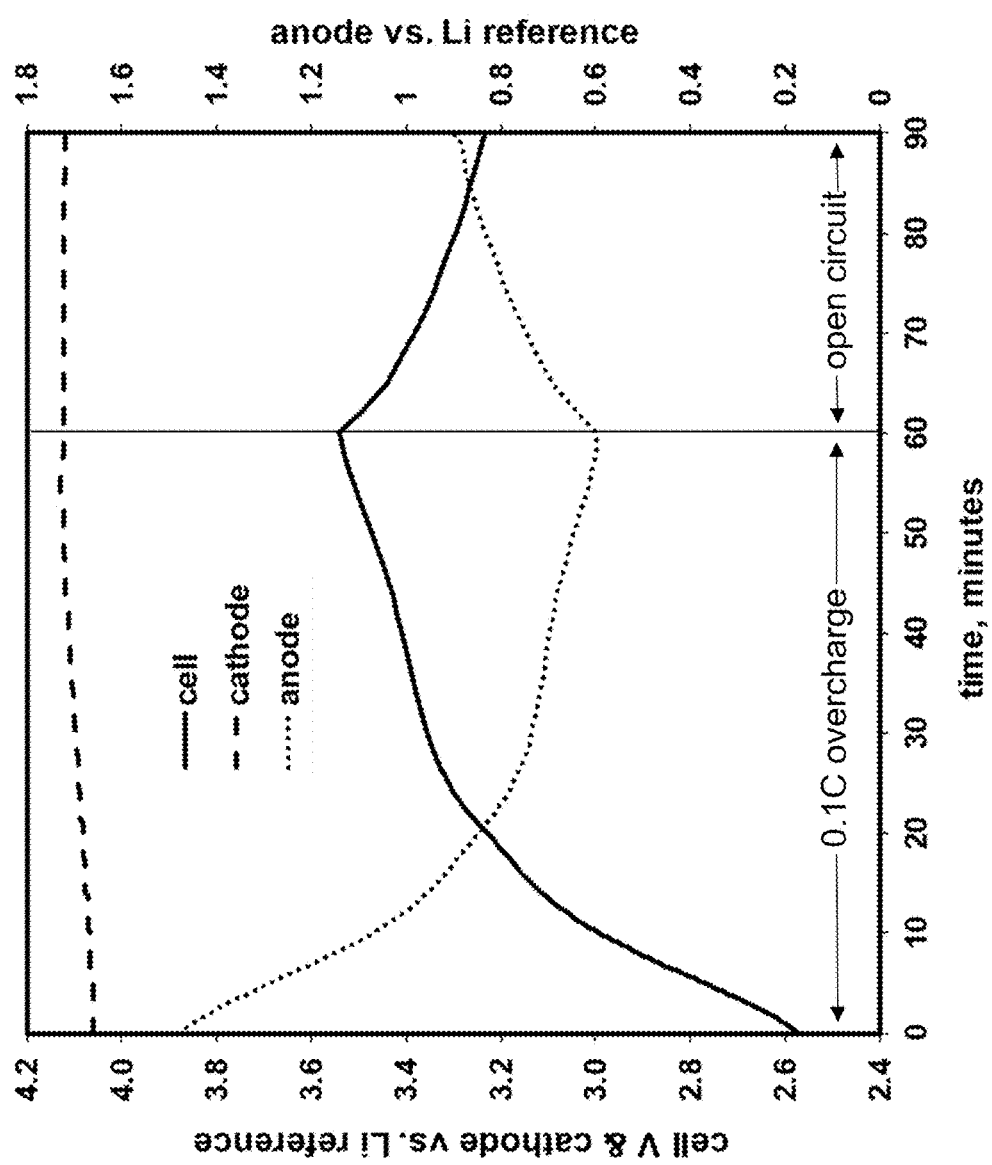
FIG. 9 illustrates cell voltage (volts, V) and electrodes V vs. Li reference (volts, V) versus time elapsed (minutes) for 10% overcharge of a cell according to some aspects as provided herein at room temperature.

FIG. 9 is a graph of the electrode potential (V vs. Li reference) and cell voltage vs. time (minutes) for the 60-minute duration cell overcharge and a subsequent 30-minute relaxation at open circuit. The graph shows that the overcharged cell voltage reached about 3.5 V, and that the cathode and anode potentials reached about 4.1 V vs. Li and 0.6 V vs. Li, respectively. At open circuit, the cell voltage decreased due to increase of the anode potential, while the cathode potential was unchanged, showing that voltage polarization at the anode was greater than that at the cathode during overcharge, and indicating that the charge passed by the cathode during overcharge was associated with its normal reversible Faradaic process, as is expected for the anode-limited cell design having about 20% excess cathode.

Figure 10:
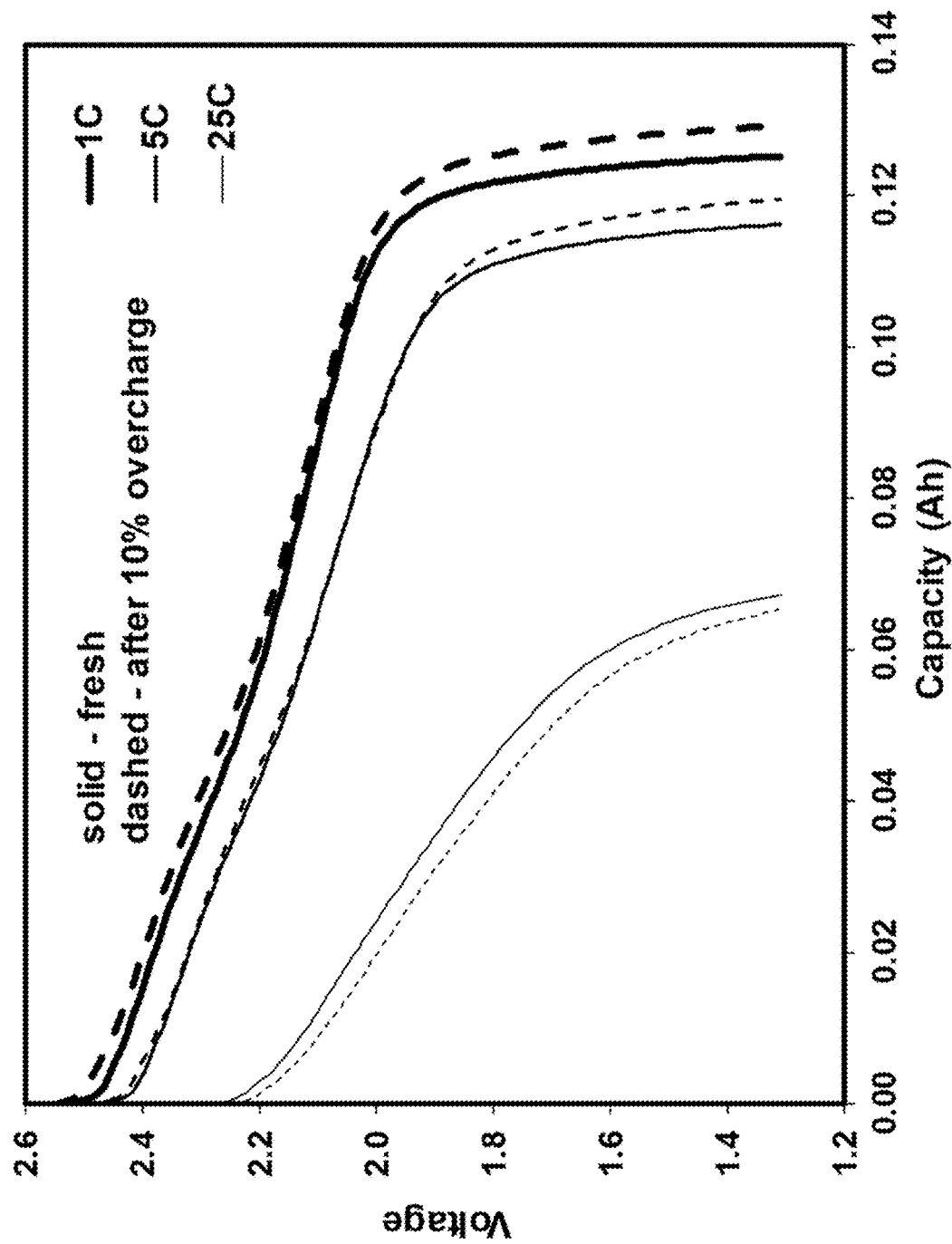
FIG. 10 illustrates voltage (volts) versus capacity (Ah) for discharges of a cell according to some aspects as provided herein at room temperature before and after it was overcharged.

FIG. 10 is a graph of voltage (volts) versus capacity (Ah) for various rate discharges of the cell at room temperature before and after it was reversed, and shows that the impact of 10% overcharge on room-temperature discharge characteristics was minimal. The voltage polarization during 25C discharge was greater after the overcharge than before, indicating that the overcharge slightly increased the cell's impedance.

Figure 11:
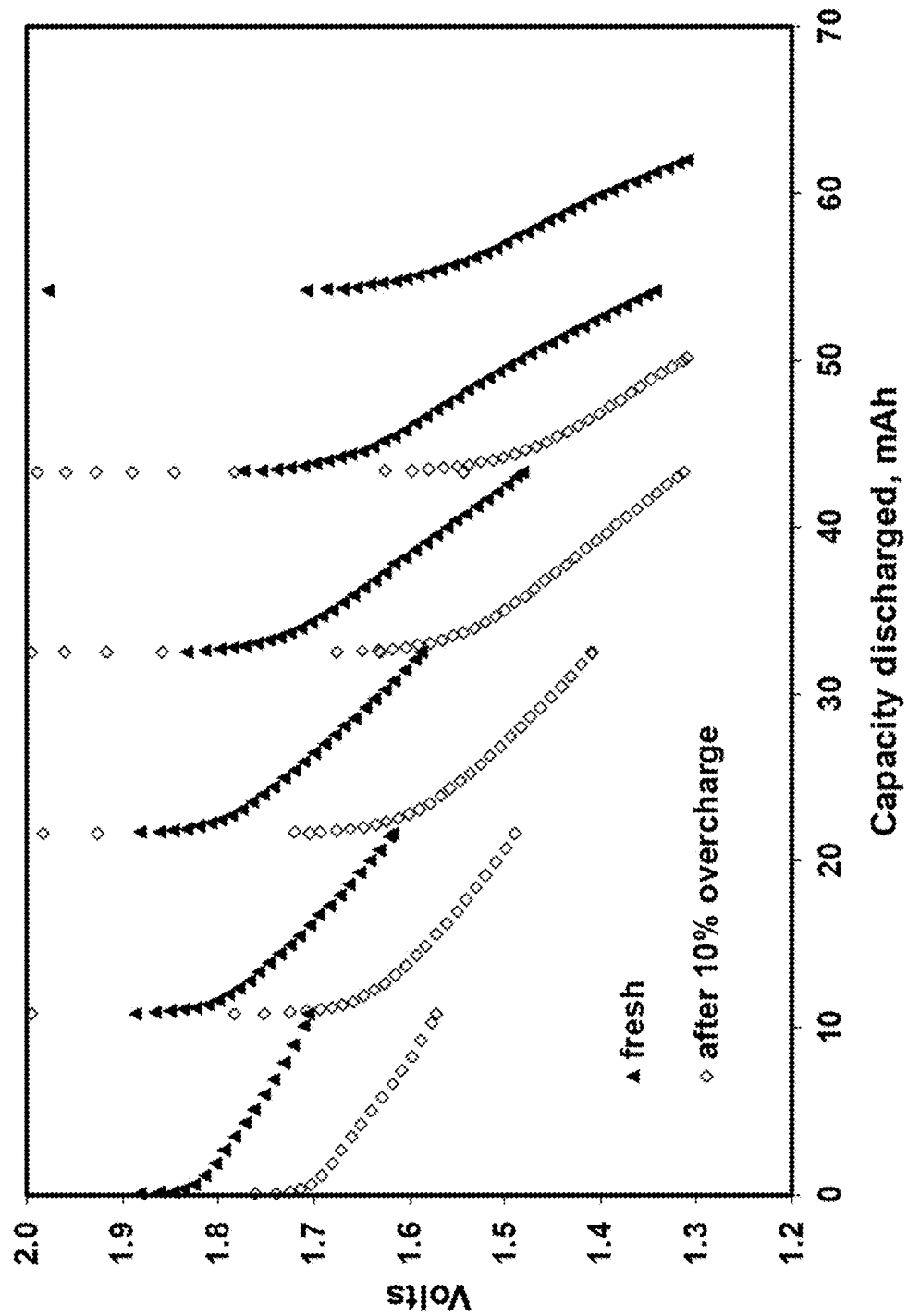
FIG. 11 illustrates voltage (volts) versus capacity discharged (mAh) for repeated high rate pulse discharges at −18° C. of a cell according to some aspects as provided herein before and after it was overcharged.

FIG. 11 is a graph of voltage (volts) versus capacity (mAh) for consecutive 10C (1.3 A), 30 second duration pulse discharges of the cell at −18° C. before and after it was overcharged. The cell rested at open circuit for 30 minutes after each pulse (before the next pulse) to ensure that it did not self-heat appreciably during the test. The cell was able to support this low-temperature pulsing across a 65 mAh depth of discharge range before being overcharged, and across a 50 mAh depth of discharge range after being reversed, while the voltage polarization during pulsing was higher after overcharge. The results for these aggressive low-temperature pulsing tests show that the cell's impedance was increased by the overcharge, but that the cell nevertheless retained a high level of performance.

Example 6

A 2.5 Ah laminate-packaged prismatic cell was made using the materials and methods of Example 1 but with the following differences.

The positive electrode active material loading was 11.2 mg/cm$^2$ and the negative electrode active material loading was 12.6 mg/cm². The individual cathode and anode pieces were 72.7 cm² in area, and were assembled in a stack with 10 layers of double-sided positive electrode, and 9 layers of double-sided plus 2 layers of single-sided negative electrode.

The cell was first charged to 2.75 V at 0.5 A, and then cycled between 2.75 V and 1.4 V at various rates to assess its performance. The cell was then cycled 1,000 times between 2.65 V and 1.4 V at room temperature at 2.5 A (1C) charge rate and 2.5 A (1C) discharge rate. During this cycling the cell continuously maintained 2.2 Ah capacity. After 1,000 cycles, the cell was discharged to 0 V and stored at room temperature for 33 months. After this storage, the cell open circuit voltage was measured to be 0 V, and the cell was then charged and cycled by the same protocol used to characterize it when it was freshly built.

Figure 12:
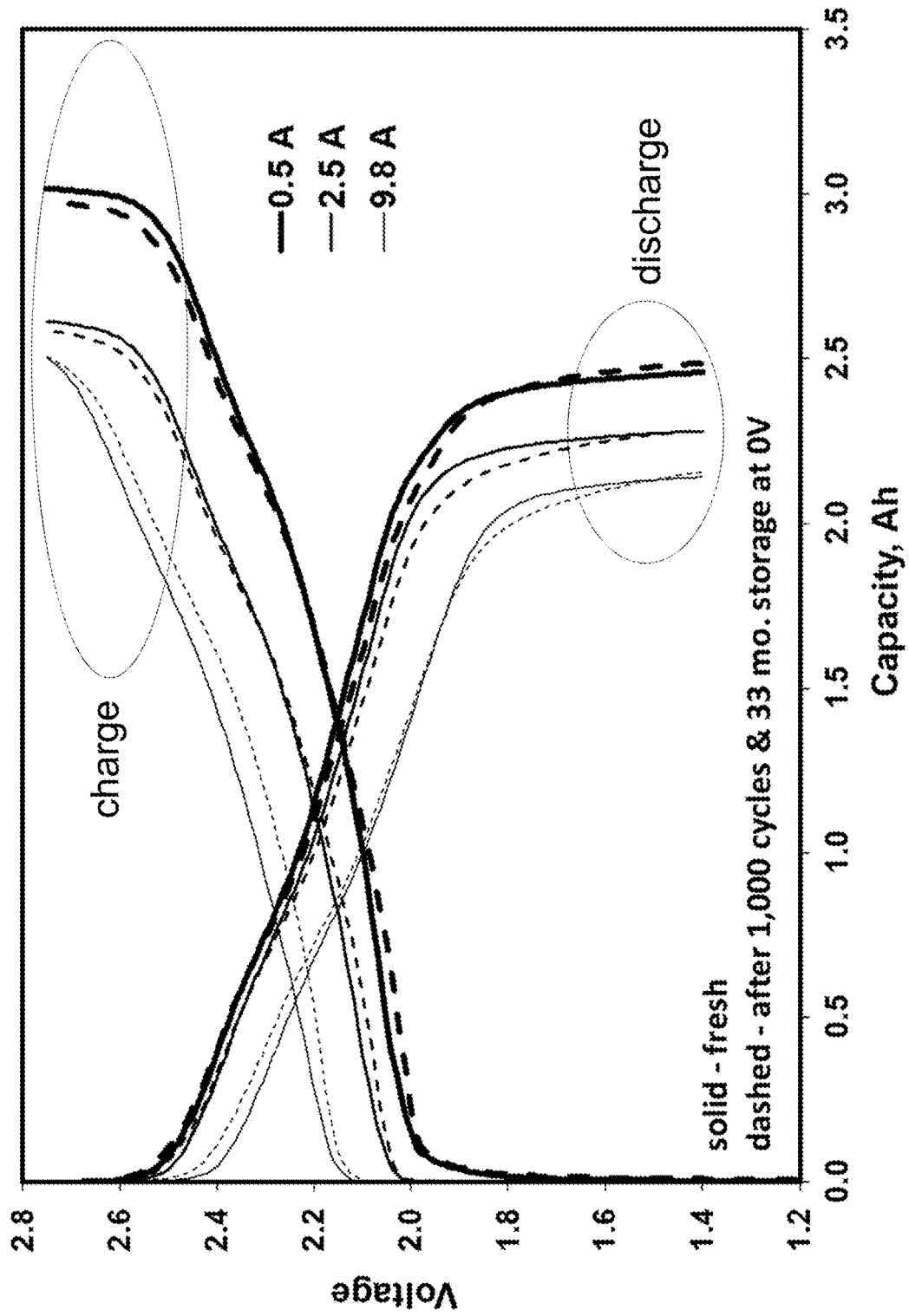
FIG. 12 illustrates voltage (volts, V) versus capacity (ampere-hours, Ah) for various rate charges and discharges at room temperature of a cell according to some aspects as provided herein before and after it underwent extensive cycling and subsequent storage in the 0V condition.

FIG. 12 is a graph of voltage (volts) versus capacity (Ah) for various rate discharges of the cell at room temperature before and after it was cycled 1,000 times and then stored for 33 months in the 0 V condition, and shows that the cell's performance was largely unchanged by the cycling and extended 0 V storage. These results demonstrate the exceptional cycling stability and storage life in the 0 V condition for this cell technology. The figure also shows that the first charge at 0.5 A after extended 0 V storage essentially duplicated the first charge at 0.5 A of the freshly made cell, indicating that discharge to 0 V returned the cell to its as-made condition.

Example 7

A 2.7 Ah laminate-packaged prismatic cell was made using the materials and methods of Example 1 but with the following differences.

The positive electrode active material loading was 8.4 mg/cm² and the negative electrode active material loading was 9.1 mg/cm². The individual cathode and anode pieces were 72.7 cm² in area, and were assembled in a stack with 15 layers of double-sided positive electrode, and 14 layers of double-sided plus 2 layers of single-sided negative electrode.

Figure 13:
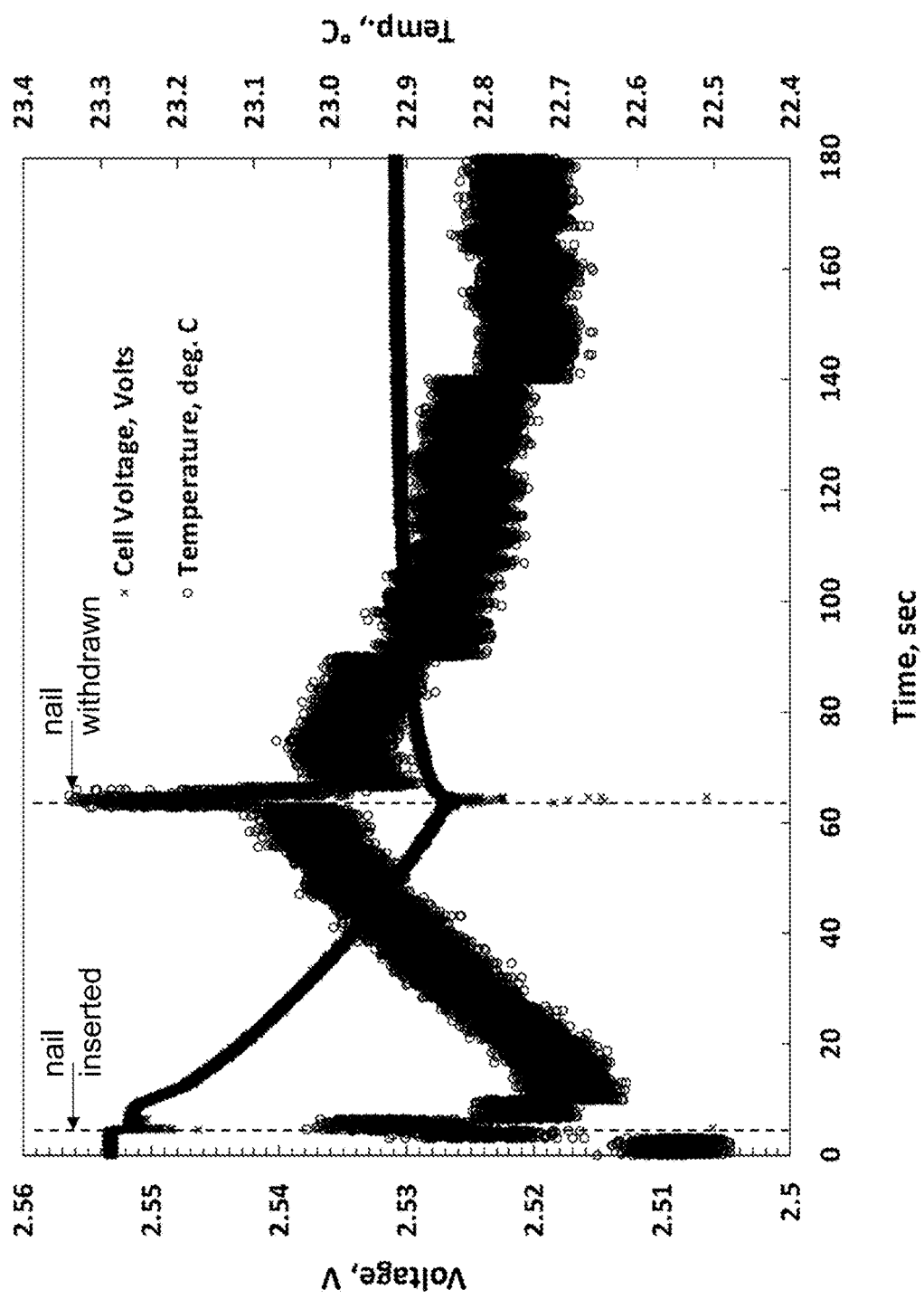
FIG. 13 illustrates voltage (volts, V) and temperature (° C.) versus time elapsed (sec.) during nail penetration abuse testing of a cell according to some aspects as provided herein.

The cell was first charged to 2.65 V and then was nail penetration tested in a custom-designed apparatus by driving a blunt 2 mm diameter stainless steel nail into it at a speed of 1 cm/sec. and holding it in the cell for 1 minute while recording the cell's voltage and surface temperature. FIG. 13 is a graph of the cell voltage (V) and surface temperature (° C.) before, during and after the nail penetration test. The figure shows that the cell's voltage decreased very slowly while the nail was in the cell, similar to the voltage change under low rate discharge (e.g., <C/10), indicating a soft short had occurred. This voltage change stopped when the nail was withdrawn, indicating clearing of the short. Similarly, the cell's surface temperature increased only very slightly during the nail penetration. These results demonstrate the cell technology's remarkable resistance to development of high-power-dissipating internal short circuits when subjected to penetrating mechanical abuse.

Example 8

A 4 Ah laminate-packaged prismatic cell was made using the materials and methods of Example 1 but with the following differences.

The positive electrode active material loading was 9.3 mg/cm² and the negative electrode active material loading was 9.0 mg/cm².

The individual cathode and anode pieces were 124.9 cm² in area, and were assembled in a stack with 12 layers of double-sided positive electrode, and 11 layers of double-sided plus 2 layers of single-sided negative electrode.

The cell's performance was first characterized by cycling it at room temperature between 2.59 V and 1.31 V at various rates, and then it was charged to 2.75 V. The charged cell was then crushed beneath a ½" diameter stainless steel bar placed across its 10 cm width over the course of 5 minutes in a custom-designed apparatus while recording the cell's voltage and surface temperature. During the crush test, the force on the bar was increased to 35 kN (3.8 tons), and the displacement measured by the crush apparatus indicated that the cell's thickness at the line of maximum crush was reduced from 5 mm to 0.5 mm. During the crush event, the cell's voltage slowly fell from 2.556 V to 2.552 V as in a low rate discharge, and the surface temperature increased by 1° C. The voltage stopped dropping and the temperature stopped increasing when the pressure on the bar and cell was released. The performance of the cell was then characterized again by cycling it between 2.59 V and 1.31 V.

Figure 14:
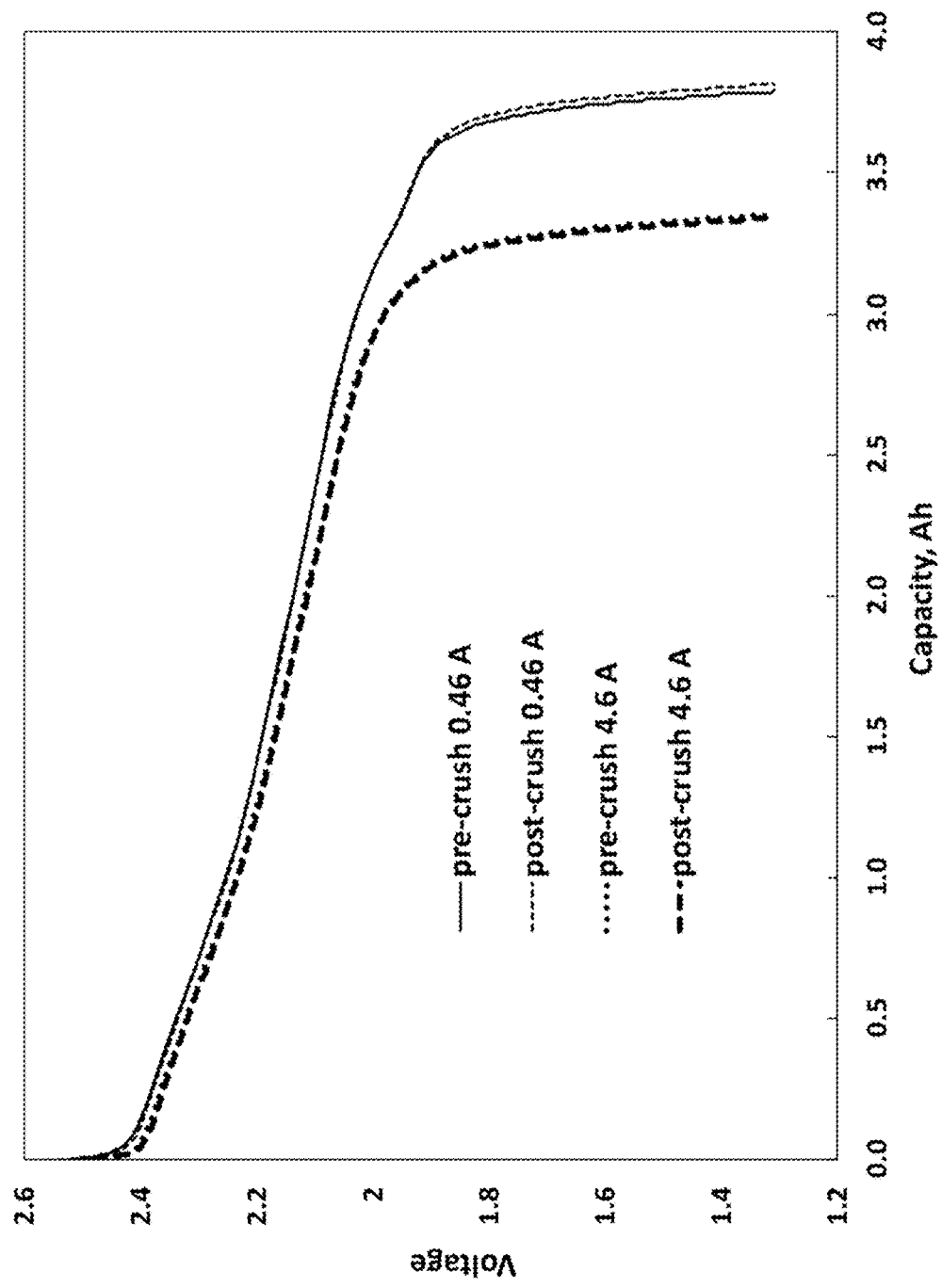
FIG. 14 illustrates voltage (volts, V) versus capacity (ampere-hours, Ah) for discharges at room temperature of a cell according to some aspects as provided herein before and after it underwent round bar crush testing.

FIG. 14 is a graph of voltage (Volts) versus capacity (Ah) for discharges of the cell at two rates at room temperature before and after it was subjected to the round bar crush. The figure shows that the performance of the cell was unaffected by the crush test, further demonstrating the cell technology's remarkable resistance to development of high-power-dissipating internal short circuits when subjected to mechanical abuse.

Example 9

A 5 Ah laminate-packaged prismatic cell was made using the materials and methods of Example 1 but with the following differences.

The positive electrode active material loading was 9.5 mg/cm² and the negative electrode active material loading was 9.1 mg/cm². The individual cathode and anode pieces were 141.9 cm² in area, and were assembled in a stack with 16 layers of double-sided positive electrode, and 15 layers of double-sided plus 2 layers of single-sided negative electrode.

The cell of this example has the following key elements:
a. A negative electrode comprising lithium titanium oxide (LTO) coated on aluminum current collector. The coating is a mixture of LTO having 10 m²/g specific surface area, acetylene black as the conductive additive, and PVdF as the binder in a weight ratio of 90:3:7. The acetylene black has a surface area of 100 m²/g (from Denka as Denka AB-100), and the PVdF (from Solvay as Solef 5130) has a molecular weight in range of 1,000,000-1,200,000 mol/g. The acetylene black conductive carbon occupies less than 5% of the surface of the anode electrode. An uncoated strip of aluminum forms the negative electrode tab.
b. A positive electrode comprising a high-nickel cathode material with the overall composition $Li_{1.01}Mg_{0.025}Ni_{0.88}Co_{0.12}Al_{0.0064}O_2$ coated onto aluminum current collector. The coating is a mixture of acetylene black and PVdF in a weight ratio of 94:3:3. The acetylene black has a surface area of 100 m²/g, and the PVdF has a molecular weight in the range of range of 1,000,000-1,200,000 mol/g. An uncoated strip of aluminum forms the positive electrode tab.
c. A 21 µm thick polyolefin separator coated with alumina-coated on one side, and having Gurley air permeability of 110 seconds; the alumina side being positioned against the positive electrode.

d. The geometric areas of the positive and negative electrodes are equal.
e. A stacked arrangement of double-sided negative electrode, separator, and double-sided positive electrode was used to assemble the electrochemical cell;
f. The stacking is such that the positive electrode tabs overlap with each other, and are ultrasonically welded to each other, and to a positive cell tab, and the negative electrode tabs overlap with each other and ultrasonically welded to each other and to the negative cell tab.
g. The terminal layers of the stack are negative electrodes;
h. An electrolyte with 1 M $LiPF_6$ in a mixture of propylene carbonate, ethyl methyl carbonate, and methyl butyrate in a weight ratio of 1:1:2 and having ionic conductivity of 11 mS/cm at 25° C. and 2 mS/cm at −40° C.

The cell's performance was characterized by a 2 A charge, 8 A discharge cycle between 2.65 V and 1.5 V at room temperature, and then it was charged to 2.65 V. The charged cell was then nail penetration tested 3 times in the manner of Example 7, and following that it was crush tested twice in the manner of Example 8. An array of 3 parallel green LEDs contacted across the cell's terminals remained lit during all 5 abuse tests. The performance of the abused cell was then characterized again by a 2 A charge, 8 A discharge cycle between 2.65 V and 1.5 V, and then the cell was cycled continuously between 2.65 V and 1.4 V at 5 A charge and discharge rates.

Figure 15:
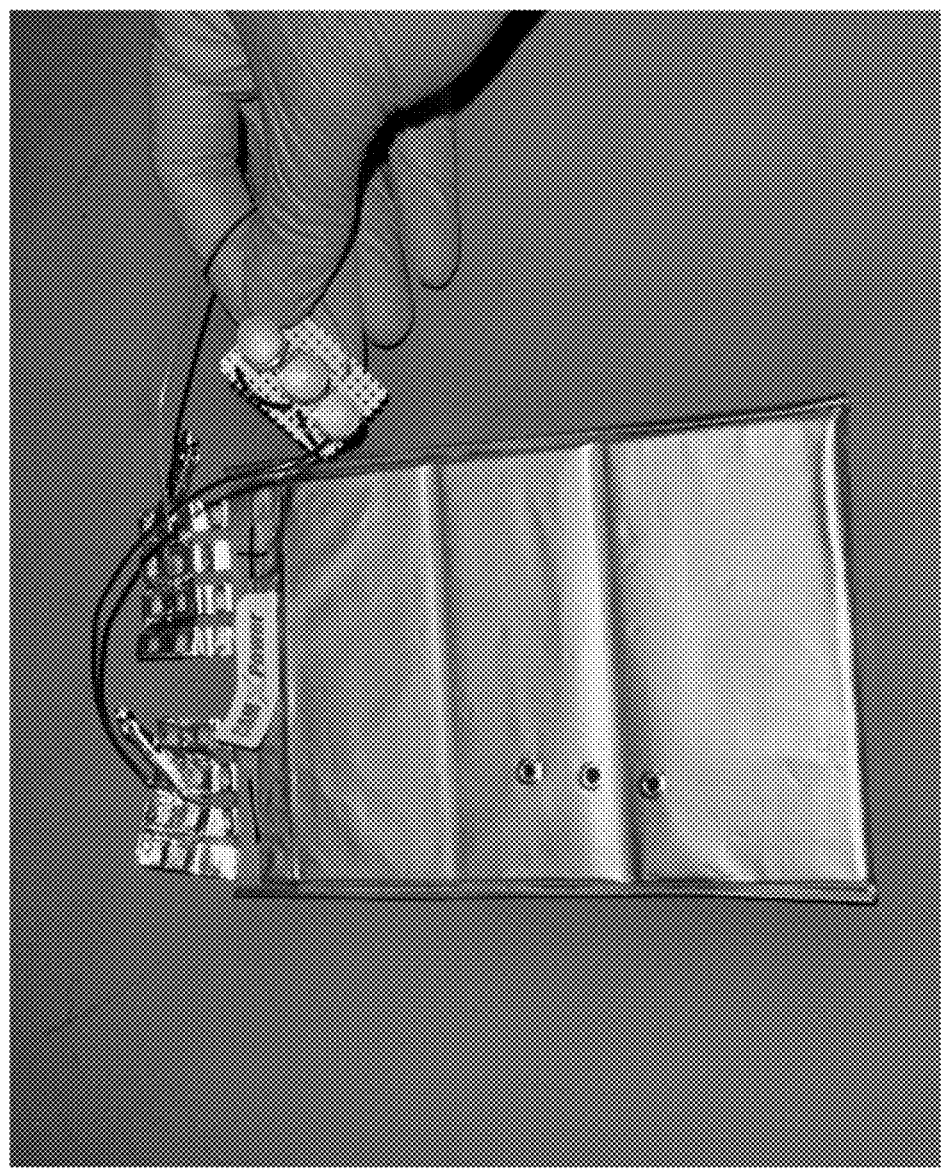
FIG. 15 is a photograph showing the integrity and continued functioning of a cell according to some aspects as provided herein after undergoing multiple extreme mechanical abuses.

FIG. 15 is a photograph of the cell following the abuse tests with the lit LEDs still contacted across its terminals, and vividly demonstrates the cell's remarkable abuse tolerance.

Figure 16:
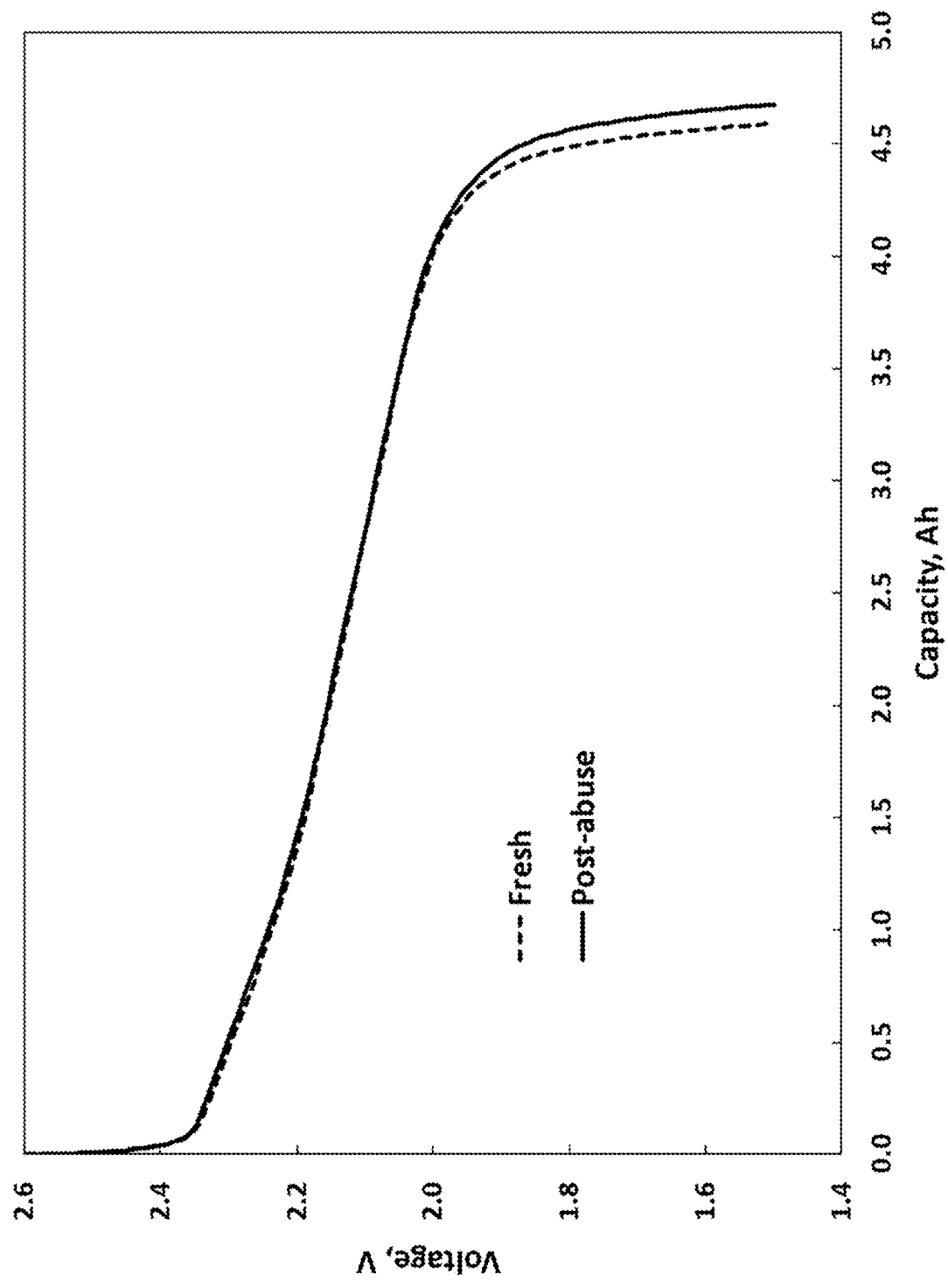
FIG. 16 illustrates voltage (volts, V) versus capacity (ampere-hours, Ah) for discharges at room temperature of a cell according to some aspects as provided herein before and after it was subjected to multiple extreme mechanical abuses.

FIG. 16 is a graph of voltage (volts) versus capacity (Ah) for discharges of the cell at 8 A at room temperature before and after it was subjected to the 5 abuse tests, showing that the cell's performance was unaffected by repeated mechanical abuses.

Figure 17:
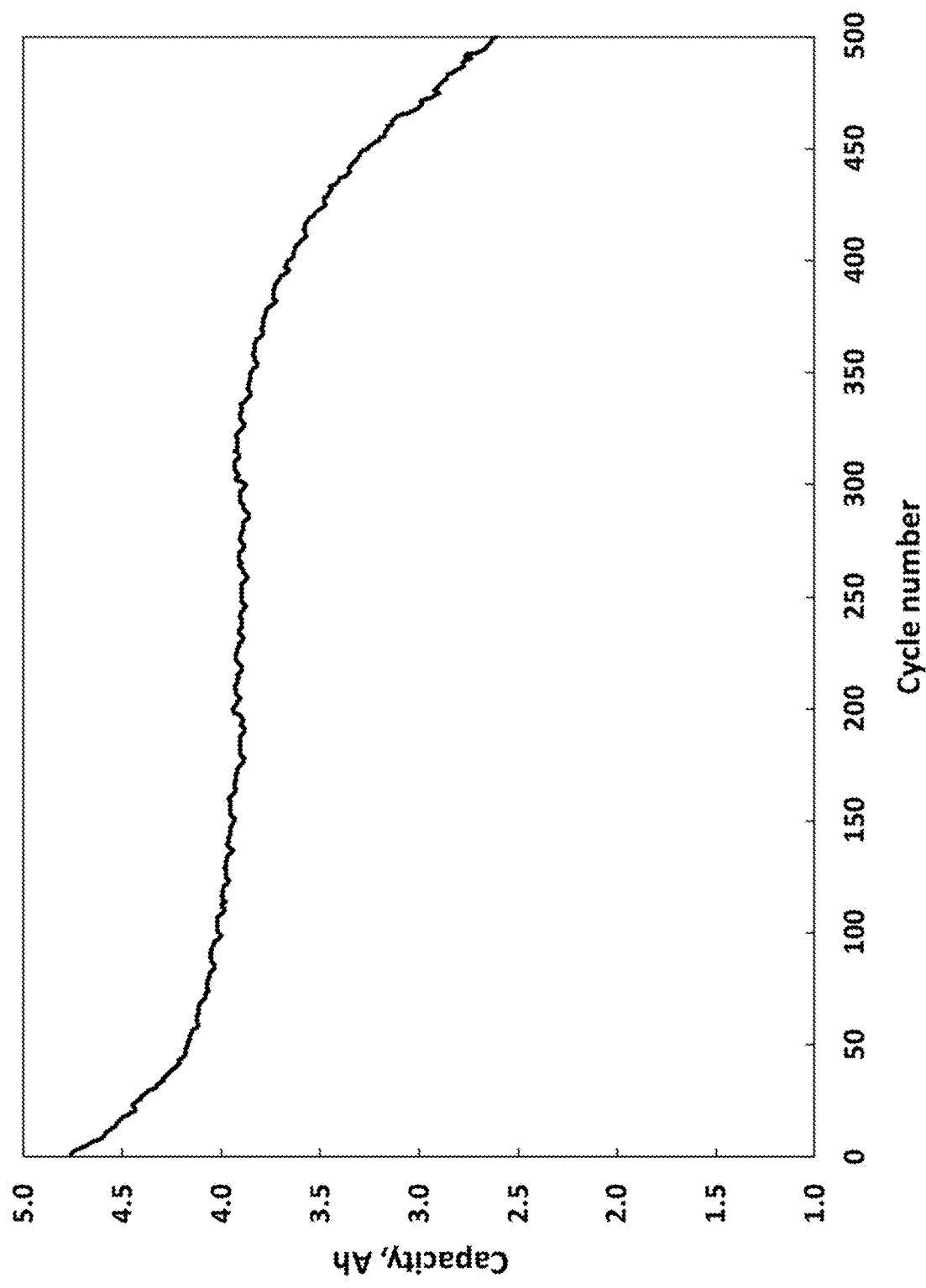
FIG. 17 illustrates cell discharge capacity (Ah) versus cycle number for continuous cycling of a cell according to some aspects as provided herein after it was subjected to multiple extreme mechanical abuses.

FIG. 17 is a graph of the cell's discharge capacity versus cycle number as it was 5 A/5 A charge/discharge cycled at room temperature in ambient atmosphere following the 5 abuse tests. The figure shows that capacity delivered by the cell declined over about the first 5 days (50+ cycles), probably because of the electrolyte losing volatile solvent components through the holes in the packaging made by nail penetration. After that, the cell cycled quite stably at about 4 Ah capacity for nearly 3 weeks without further significant capacity loss until over 300 cycles had elapsed, at which point the cell's performance decline was probably due to the accumulated gradual penetration of atmospheric moisture through the nail holes in the packaging. These results indicate that the only impacts the severe penetration and crush abuses had on cell performance were attributable to packaging damage, further demonstrating the exceptional robustness of this cell technology.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the scope thereof. Therefore, it is intended that this disclosure not be limited to the particular embodiments disclosed as the best mode contemplated for carrying out this disclosure. It should also be understood that the embodiments disclosed herein should be considered in a descriptive sense only and not for purposes of limitation. Descriptions of features, advantages, or aspects of each embodiment should be considered as available for other similar features, advantages, or aspects of other embodiments.

Various modifications of the present disclosure, in addition to those shown and described herein, will be apparent to those skilled in the art of the above description. Such modifications are also intended to fall within the scope of the appended claims.

It is appreciated that all reagents and components are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An electrochemical cell comprising:
   a cathode, the cathode comprising a polycrystalline cathode electrochemically active material comprising the formula $Li_{1+x}MO_{2+y}$, wherein $-0.9 \leq x \leq 0.3$, $-0.3 \leq y \leq 0.3$, and wherein M comprises Ni at 80 atomic percent or higher relative to total M, the cathode electrochemically active material comprising a non-uniform distribution of Co;
   an anode comprising an anode electrochemically active material of the formula $Li_{4+a}Ti_5O_{12+b}$ wherein $-0.3 \leq a \leq 3.3$, $-0.3 \leq b \leq 0.3$; and
   wherein the anode and the cathode each independently comprising a current collector substrate comprising aluminium, and
   wherein the electrochemical cell is characterized by a substantially unchanged voltage to capacity profile following puncture by a blunt 2 mm diameter stainless steel nail at a speed of 1 cm/sec.

2. The electrochemical cell of claim 1 wherein the electrochemical cell is characterized by substantially unchanged performance following 1000 cycles and subsequent storage for 33 months at 0V condition.

3. The electrochemical cell of claim 1 wherein the electrochemical cell is characterized by a 10C capacity decline of less than 10% following cycling 1,000 times between 2.43 V and 1.33 V in a 45° C. oven at 10C charge rate and 10C discharge rate without external constraints.

4. The electrochemical cell of claim 1 wherein the electrochemical cell is characterized by delivery of over 30% capacity when discharged to 1.2 V at a rate of 3.3C at negative 50 degrees Celsius.

5. The electrochemical cell of claim 1, capable of being charged at a rate of at least 1C at negative 50 degrees Celsius.

6. The electrochemical cell of claim 1 wherein the anode and cathode are in a pouch cell.

7. The electrochemical cell of claim 1 further comprising a separator comprising a ceramic, the ceramic in the form of a coating on a separator surface or as a filler within the separator.

8. The electrochemical cell of claim 7 wherein the ceramic is a ceramic oxide, optionally aluminum oxide.

9. The electrochemical cell of claim 1 further comprising a separator comprising a porous polyolefin.

10. The electrochemical cell of claim 1 wherein the area ratio of anode to cathode is less than or equal to 1, or wherein a capacity ratio of anode to cathode is less than or equal to 1, or both.

11. The electrochemical cell of claim 1 further comprising an electrolyte comprising a solvent and a salt.

12. The electrochemical cell of claim 11 wherein the electrolyte comprises $LiPF_6$ salt in a mixture of propylene carbonate, ethyl methyl carbonate, and methyl butyrate.

13. The electrochemical cell of claim 1 wherein the anode and the cathode comprise a PVdF binder.

14. The electrochemical cell of claim 1 wherein the cathode electrochemically active material includes a plurality of crystallites and a grain boundary between the plurality of crystallites, wherein a concentration of cobalt, aluminum, or both is higher in the grain boundary than in a center of the adjacent crystallites.

15. The electrochemical cell of claim 1 wherein M in the formula $Li_{1+x}MO_{2+y}$ comprises Ni and one or more metals selected from the group consisting of Mg, Sr, Co, Al, Ca, Cu, Zn, Mn, V, Ba, Zr, Ti, Cr, Fe, Mo, B, and any combination thereof.

16. The electrochemical cell of claim 1 wherein the cathode electrochemically active material comprises Ni and one or more of Mg, Co, or Al.

17. An electrochemical pouch cell comprising:
   a cathode, the cathode comprising a cathode electrochemically active polycrystalline material comprising the formula $Li_{1+x}MO_{2+y}$, wherein $-0.9 \leq x \leq 0.3$, $-0.3 \leq y \leq 0.3$, and wherein M comprises Ni at 80 atomic percent or higher relative to total M, wherein the cathode electrochemically active material includes a plurality of crystallites and a grain boundary between the plurality of crystallites, wherein the concentration of cobalt, aluminum, or both is higher in the grain boundary than in the center of the adjacent crystallites;
   two or more anodes comprising an anode electrochemically active material of the formula $Li_{4+a}Ti_5O_{12+b}$ wherein $-0.3 \leq a \leq 3.3$, $-0.3 \leq b \leq 0.3$;
   wherein the anode and the cathode independently further comprise a PVdF binder intermixed with the anode electrochemically active material and the cathode electrochemically active material respectively;
   the anode and the cathode each independently further comprise a current collector substrate comprising aluminium, wherein the cathode current collector is coated with respective electrochemically active material on two sides;
   a porous polyolefin separator;
   an electrolyte comprising a lithium salt and a carbonate solvent;
   wherein the two or more anodes are terminal layers of a stack of electrodes;
   wherein an area ratio of anode to cathode is less than or equal to 1; and
   wherein a capacity ratio of anode to cathode is less than 1, and
   wherein the electrochemical cell is characterized by a substantially unchanged voltage to capacity profile following puncture by a blunt 2 mm diameter stainless steel nail at a speed of 1 cm/sec.

18. The electrochemical cell of claim 17 wherein the electrochemical cell is characterized by substantially unchanged performance following 1000 cycles and subsequent storage for 33 months at 0 V condition.

19. The electrochemical cell of claim 17 wherein the unconstrained electrochemical cell is characterized by a 10C capacity decline of less than 10% following cycling 1,000 times between 2.43 V and 1.33 V in a 45° C. oven at 10C charge rate and 10C discharge rate.

20. The electrochemical cell of claim 17 wherein the electrochemical cell is characterized by delivery of over 40% capacity when discharged to 1.2 V at a rate of 3.3C at −50° C. and charged at 1C rate at −50° C.

21. The electrochemical cell of claim 17 wherein the separator comprises a ceramic, the ceramic in the form of a coating on a separator surface or as a filler within the separator.

22. The electrochemical cell of claim 21 wherein the ceramic is a ceramic oxide, optionally aluminum oxide.

23. The electrochemical cell of claim 17 wherein M in the formula $Li_{1+x}MO_{2+y}$ comprises Ni and one or more metals selected from the group consisting of Mg, Sr, Co, Al, Ca, Cu, Zn, Mn, V, Ba, Zr, Ti, Cr, Fe, Mo, B, and any combination thereof.

24. The electrochemical cell of claim 17 wherein the cathode electrochemically active material comprises Ni and one or more of Mg, Co, or Al.

* * * * *